United States Patent
Imanishi et al.

(10) Patent No.: US 9,776,660 B2
(45) Date of Patent: Oct. 3, 2017

(54) VEHICLE SUBFRAME

(71) Applicant: HONDA MOTOR CO., LTD., Minato-Ku, Tokyo (JP)

(72) Inventors: Tomoyuki Imanishi, Wako (JP); Toshimitsu Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/786,349

(22) PCT Filed: Apr. 25, 2014

(86) PCT No.: PCT/JP2014/061665
§ 371 (c)(1),
(2) Date: Oct. 22, 2015

(87) PCT Pub. No.: WO2014/175414
PCT Pub. Date: Oct. 30, 2014

(65) Prior Publication Data
US 2016/0075379 A1    Mar. 17, 2016

(30) Foreign Application Priority Data

Apr. 26, 2013 (JP) .................................. 2013-093326
Apr. 26, 2013 (JP) .................................. 2013-093343
Apr. 26, 2013 (JP) .................................. 2013-093901

(51) Int. Cl.
*B62D 21/11* (2006.01)
*B22C 9/24* (2006.01)
(Continued)

(52) U.S. Cl.
CPC ................ *B62D 21/11* (2013.01); *B22C 9/24* (2013.01); *B22D 19/00* (2013.01); *B62D 29/007* (2013.01); *B62D 29/008* (2013.01)

(58) Field of Classification Search
CPC ...... B62D 21/11; B62D 25/20; B62D 25/2018
See application file for complete search history.

(56) References Cited

U.S. PATENT DOCUMENTS 6,409,216 B2 * 6/2002 Suzuki ............... B01D 46/2411
                                                      280/736
6,494,472 B2 * 12/2002 Suzuki .................... B62D 21/11
                                                      280/124.109
(Continued)

FOREIGN PATENT DOCUMENTS

JP    2007-253642 A    10/2007
JP    2009-051449 A    3/2009
JP    2009-298402 A    12/2009

*Primary Examiner* — James A English
(74) *Attorney, Agent, or Firm* — Carrier Blackman & Associates, P.C.; Joseph P. Carrier; Jingli Wang

(57) ABSTRACT

A vehicle subframe is provided with a main body formed in a hollow shape by a core unit. The subframe includes: a top parallel section and a bottom rear parallel section provided to the top and the bottom of the main body; a top left sand elimination opening and a top right sand eliminating opening formed at the top parallel section; and a left bottom rear sand elimination opening and a right bottom rear sand elimination opening formed at the bottom rear parallel section. The left bottom rear sand elimination opening is provided to a site opposing the top left sand elimination opening, and is formed in a shape equivalent to the top left sand elimination opening. The right bottom rear sand elimination opening is provided to a site opposing the top right sand elimination opening, and is formed in a shape equivalent to the top right sand elimination opening.

9 Claims, 22 Drawing Sheets

(51) Int. Cl.
B22D 19/00 (2006.01)
B62D 29/00 (2006.01)

(56) References Cited

U.S. PATENT DOCUMENTS

| | | | |
|---|---|---|---|
| 7,946,377 B2 | 5/2011 | Frasch et al. | |
| 8,403,347 B2 * | 3/2013 | Eickmann | B60G 21/0551 |
| | | | 180/312 |
| 9,457,636 B2 * | 10/2016 | Minoda | B60G 21/055 |
| 2002/0050706 A1 * | 5/2002 | Mikasa | B22D 17/00 |
| | | | 280/788 |
| 2009/0051154 A1 * | 2/2009 | Eickmann | B60G 21/0551 |
| | | | 280/788 |
| 2014/0248508 A1 * | 9/2014 | Ohhama | B32B 15/043 |
| | | | 428/638 |
| 2015/0075896 A1 * | 3/2015 | Imanishi | B62D 21/11 |
| | | | 180/312 |
| 2015/0076805 A1 * | 3/2015 | Imanishi | B22D 17/22 |
| | | | 280/781 |
| 2015/0152526 A1 * | 6/2015 | Asami | B22D 17/2218 |
| | | | 420/532 |
| 2015/0166104 A1 * | 6/2015 | Ohhama | B62D 21/11 |
| | | | 296/193.01 |
| 2016/0068189 A1 * | 3/2016 | Imanishi | B22C 9/10 |
| | | | 296/204 |

* cited by examiner

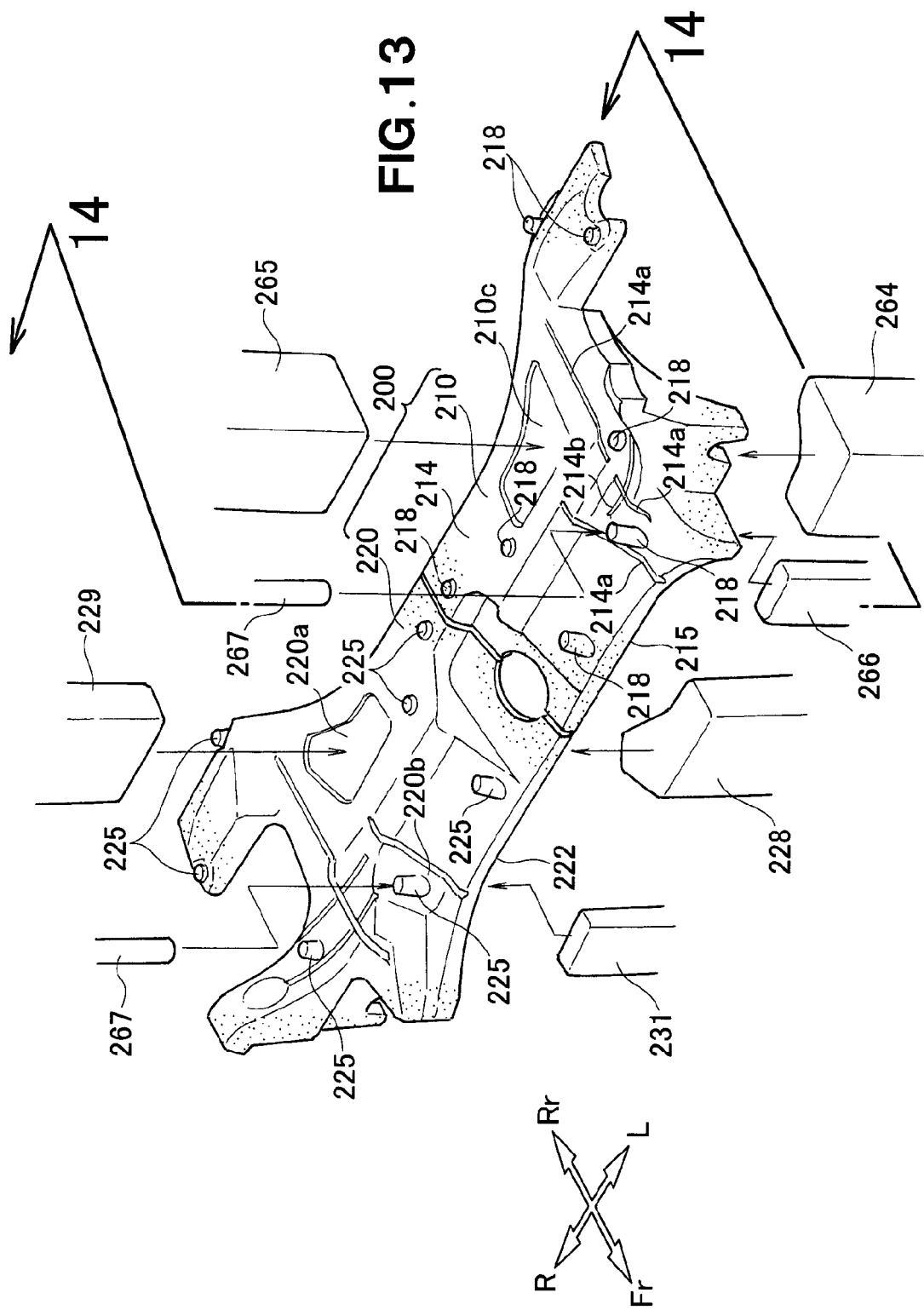

VEHICLE SUBFRAME

TECHNICAL FIELD

The present invention relates to a vehicle subframe provided under a vehicle body for supporting left and right suspensions at left and right end portions thereof.

BACKGROUND ART

Some known vehicles include a subframe made by casting and provided on a vehicle frame for supporting thereon a structural component such as a transmission. The subframe is formed into a hollow shape by means of a core which is disposed in a cavity of a casting mold when the subframe is formed by casting. The subframe further has a core discharge opening (hereinafter referred to as "sand discharge opening") formed at a bottom part thereof for allowing the core to be discharged after casting. By virtue of the hollow shape, the subframe is made light in weight (See, Patent Document 1, for example).

PRIOR ART LITERATURE

Patent Documents

[Patent Document 1] Japanese Patent Application Laid-open Publication (JP-A) No. 2009-298402

SUMMARY OF INVENTION

Technical Problems

When the sand discharge opening formed at the bottom part of the subframe is to be produced, the core must be directly supported by either of a fixed mold and a movable mold. In this instance, the core is subjected to a pressure applied from only one of the fixed mold and the movable mold.

Under such condition, it may occur that in casting a subframe, the core is displaced by a molten metal flowing into the cavity. Displacement of the core will make it difficult to produce a subframe having a uniform wall thickness, allowing the generation of a thickened wall-thickness part, which will hinder weight reduction of the subframe. The difficulty in forming a uniform wall thickness for the subframe also causes hindrance to uniform distribution of strength over the entire area of the subframe.

An object of the present invention is to provide a vehicle subframe which is capable of making the wall thickness uniform and which can secure desired rigidity and strength.

Solutions to Problems

According to one aspect of the present invention, there is provided a vehicle subframe cast-molded into a unitary structure using a core, the vehicle subframe comprising a body formed into a hollow shape by means of the core and including a top wall and a bottom wall spaced from each other in a vertical direction at a predetermined interval, and left and right suspension support portions provided at left and right ends of the body for supporting left and right suspensions, characterized in that the vehicle subframe further includes: a top parallel section and a bottom parallel section that are substantially parallel to each other in a front-and-rear direction of a vehicle and that are provided in the top wall and the bottom wall, respectively, of the body; top openings formed in the top parallel section; and bottom openings provided at parts of the bottom parallel section which are opposed to respective ones of the top openings, the bottom openings being formed into a shape equivalent to a shape of the top openings.

Preferably, the top wall includes an inclined section provided at a front part thereof in the front-and-rear direction of the vehicle, the inclined section being downward inclined toward a front side of the vehicle, and inclined openings formed in the inclined section, and wherein the bottom wall includes front openings formed therein at portions which are opposed to respective ones of the inclined opening.

Preferably, the body has longitudinal ribs provided at a part located adjacent to each of the left and right suspension support portions and extending in the front-and-rear direction of the vehicle, and lateral ribs provided at the part and extending in a width direction of the vehicle.

The body is provided with a connecting portion adapted to be connected with a connecting member for supporting a power plant forming a drive source of the vehicle, and wherein the body includes ribs extending from the connecting portion toward an outer side of the body, and holes formed near respective ones of the ribs by means of core supporting portions used for supporting the core.

Advantageous Effects of Invention

According to a preferred form of the invention, the top parallel section and the bottom parallel section are provided on the top wall and the bottom wall, respectively, of the body, and the top openings and the bottom openings are formed in the top parallel section and the bottom parallel section, respectively.

This arrangement ensures that equal supporting forces can be applied from both a side of the bottom openings and a side of the top openings to the core while the core is disposed in a cavity of a casting mold. The core can thus be prevented from displacing by a molten metal flowing into the cavity so that a subframe formed by cast-molding can have a uniform wall thickness. The subframe having such uniform wall thickness is free from a thickened portion and a weight reduction of the subframe can be attained. A further advantage attained by the wall thickness of the subframe which is made uniform is that the strength of the subframe is made stable over the entire area of the subframe.

Furthermore, since the inclined openings are formed in the inclined section of the top wall and the front openings are formed in the bottom wall at portions opposed with the inclined openings, the core disposed in the cavity can receive equal supporting forces applied by the casting mold from both a side of the inclined openings and a side of the front openings. A displacement of the core, which would otherwise occur while the core is disposed in the cavity, can be prevented in more suitable manner, and the uniformity in wall thickness of the subframe can be further improved. Especially, the inclined openings are openings which are formed by core holding pins, and the front openings are sand eliminating openings. This arrangement ensures that each of the core holding pins and a corresponding one of the sand eliminating openings can be arranged in opposed relation to each other. By thus positioning the core holding pins and the sand eliminating openings in alignment with each other, the core can be held properly without increasing the number of sand eliminating openings more than necessary.

Furthermore, according to the invention, the longitudinal ribs and the lateral ribs are provided at the part located adjacent to each of the left and right suspension support portions. The part of the body which is located adjacent to the suspension support portion is reinforced by the longitudinal ribs and the lateral ribs, so that desired rigidity and strength of the subframe (more particularly, the suspension support portion) can be ensured. This will ensure that a load inputted from the suspension arm to the suspension support portion can be suitably supported by the subframe.

Preferably, the longitudinal ribs on the top wall and the longitudinal ribs on the bottom wall are disposed alternately with each other in the vehicle width direction, and the lateral ribs on the top wall and the lateral ribs on the bottom wall are disposed alternately with each other in the vehicle front-and-rear direction. The longitudinal ribs on the top wall and the longitudinal ribs on the bottom wall are formed by recessed longitudinal grooves formed in a top surface and a bottom surface, respectively, of the core. To form the longitudinal ribs on the top wall and the longitudinal ribs on the bottom wall that are disposed in an alternate manner in the vehicle width direction, the longitudinal grooves in the top surface and the longitudinal grooves in the bottom surface are disposed alternately with each other.

Similarly, the lateral ribs on the top wall and the lateral ribs on the bottom wall are formed by recessed lateral grooves formed in the top and bottom surfaces of the core. To form the lateral ribs on the top wall and the lateral ribs on the bottom wall that are disposed alternately in the vehicle front-and-rear direction, the lateral grooves in the top surface and the lateral grooves in the bottom surface are arranged alternately in the vehicle front-and-rear direction.

With the longitudinal and lateral grooves on the top surface which are arranged alternately with the longitudinal and lateral grooves, respectively, on the bottom surface, that part of the core which includes the longitudinal groove or the lateral groove can have a larger thickness than a thickness attained by a case in which the longitudinal grooves and the lateral grooves on the top surface are arranged to overlap or align with the longitudinal groove and the lateral grooves, respectively, in the bottom surface. A desired strength of the core can be ensured in a state in which the core has the longitudinal and lateral grooves formed therein.

In the arrangement in which the longitudinal ribs on the top wall and the longitudinal ribs on the bottom wall are arranged alternately and the lateral ribs on the top wall and the lateral ribs on the bottom wall are arranged alternately, that part of the hollow part which includes the longitudinal or lateral rib can possess a larger cross-sectional area than a cross-sectional area attained by a case in which the ribs on the top wall and the ribs on the bottom wall are arranged to overlap or align with each other. With this arrangement, the corer can be smoothly removed from the subframe, without interruption by the longitudinal ribs or the lateral ribs.

Furthermore, according to the invention, the ribs extend from the connecting portion toward the outside of the body. With this arrangement, it is possible to support or bear a load applied to the connecting portion. The holes formed by the core supporting portions used for supporting the core are provided near the respective ribs. The holes can thus be prevented from forming a starting point of stress concentration, which may otherwise occur when it is subjected to a load applied thereto. A reduction in the rigidity and strength of the subframe does never take place due to the presence of the holes formed by the core supporting portions.

By virtue of the holes reinforced by the ribs, the core supporting portions are allowed to be disposed at portions located adjacent to the connecting portion or the left or right suspension support portion. This will ensure that the core can be suitably set by the core supporting portions, and the wall thickness of the subframe can be formed in a uniform manner.

The ribs extend diagonally rearward from the connecting portion so that a load inputted to the connecting portion can be efficiently supported or borne by the ribs, and desired rigidity and strength of the subframe can be ensured.

The ribs extend from the connecting portion toward the left and right suspension support portions so that the load inputted to the connecting portion or the loads inputted to the left and right suspension support portions can be efficiently supported or borne by the ribs, and the desired rigidity and strength of the subframe can be ensured.

The holes are surrounded by the ribs, parallel ribs and crossing ribs. By thus reinforcing the holes by the ribs, the parallel ribs and the crossing ribs, it is possible to prevent the holes from forming a starting point of stress concentration in a more suitable manner.

BRIEF DESCRIPTION OF DRAWINGS

FIG. 13 is a perspective view of a core used for molding the subframe shown in FIG. 1;

DESCRIPTION OF EMBODIMENT

A certain preferred structural embodiment of the present invention will be described in detail below with reference to the accompanying sheets of drawings. The terms "front (Fr)", "rear (Rr)", "left (L)" and "right (R)" are used herein to refer to directions as viewed from a driver.

Embodiment

Figure 1:
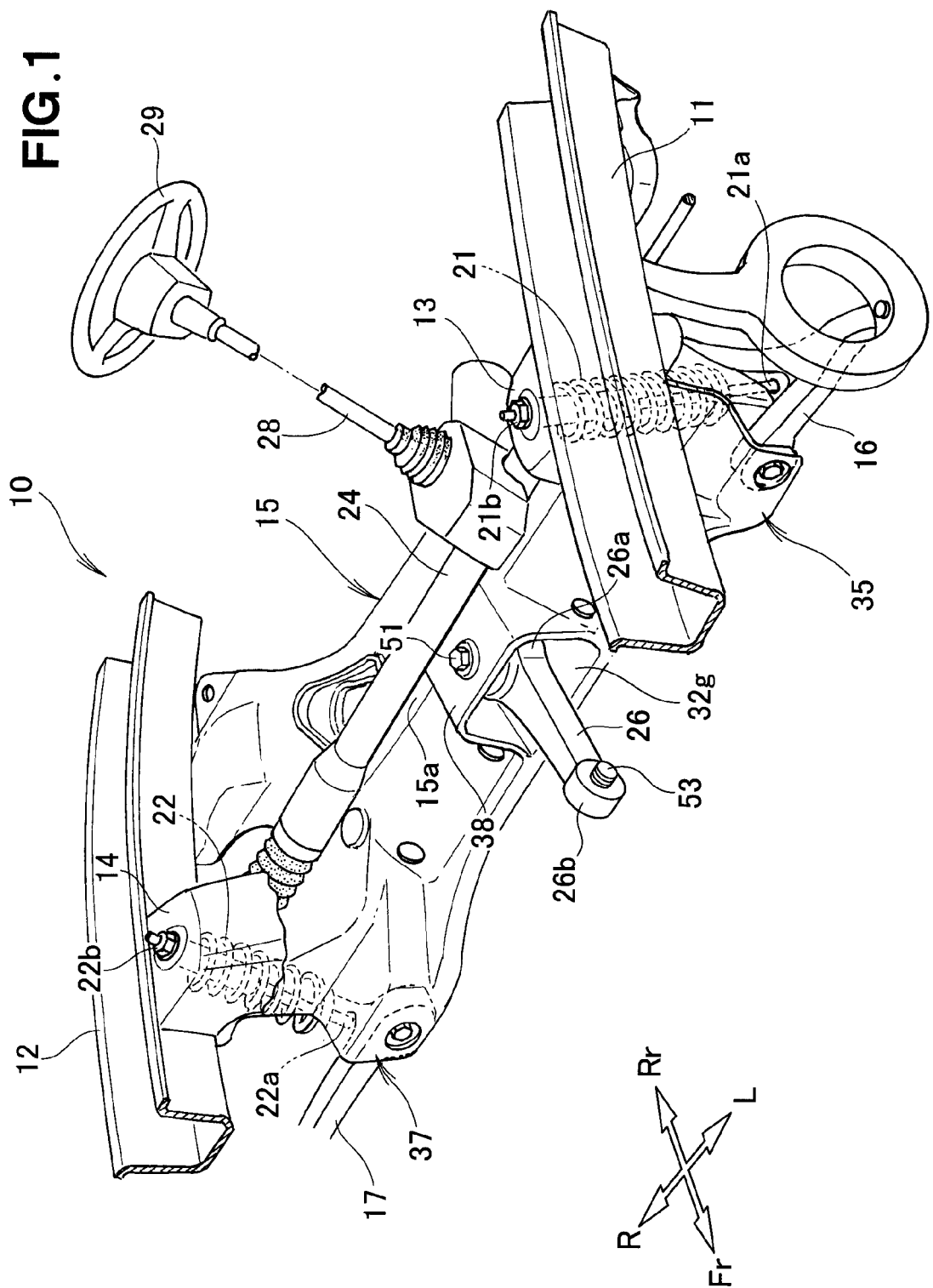
FIG. 1 is a perspective view of a vehicle body front part structure provided with a subframe according to the present invention.
Figure 2:
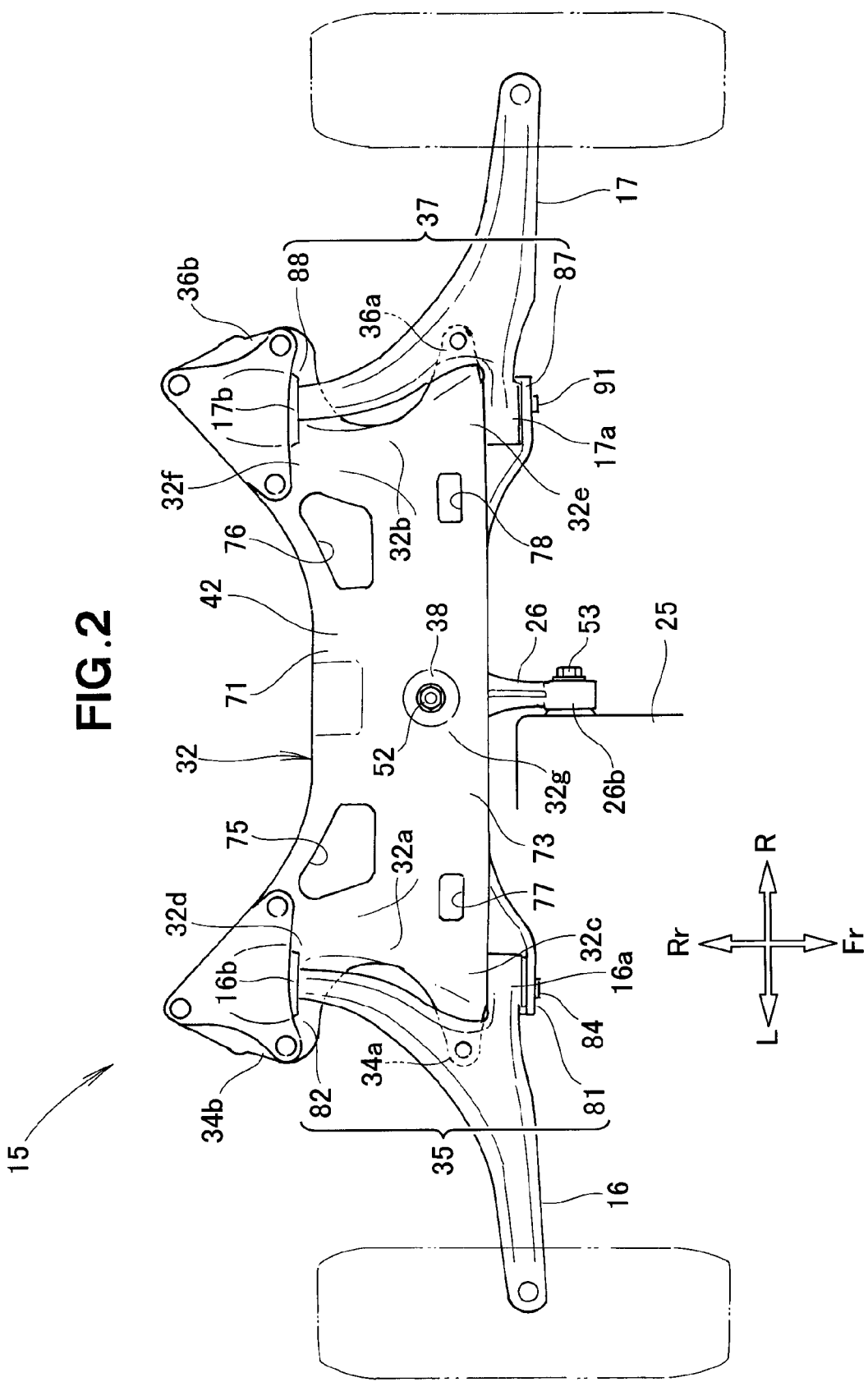
FIG. 2 is a bottom view of the subframe shown in FIG. 1.

As shown in FIGS. 1 and 2, a vehicle body front part structure 10 includes left and right side frames 11 and 12 disposed to extend in a front-and-rear or longitudinal direction of a vehicle body, a subframe 15 attached under the left and right side frames 11, 12, left and right suspension arms 16 and 17 provided at left and right end portions of the subframe 15, and left and right suspensions 21 and 22 connected to the left and right suspension arms 16, 17.

The vehicle body front part structure 10 further includes a steering gearbox 24 attached to an upper part 15a of the subframe 15, and a torque rod 26 interconnecting the subframe 15 and a power plant 25. A steering shaft 28 extends upwardly from the gearbox 24, and a steering wheel 29 is connected to an upper end of the steering shaft 28. The power plant 25 is comprised of an engine-transmission unit disposed in a lateral direction between the left and right side frames 11, 12, the engine-transmission unit including an engine and a transmission formed integrally with each other.

Figure 3:
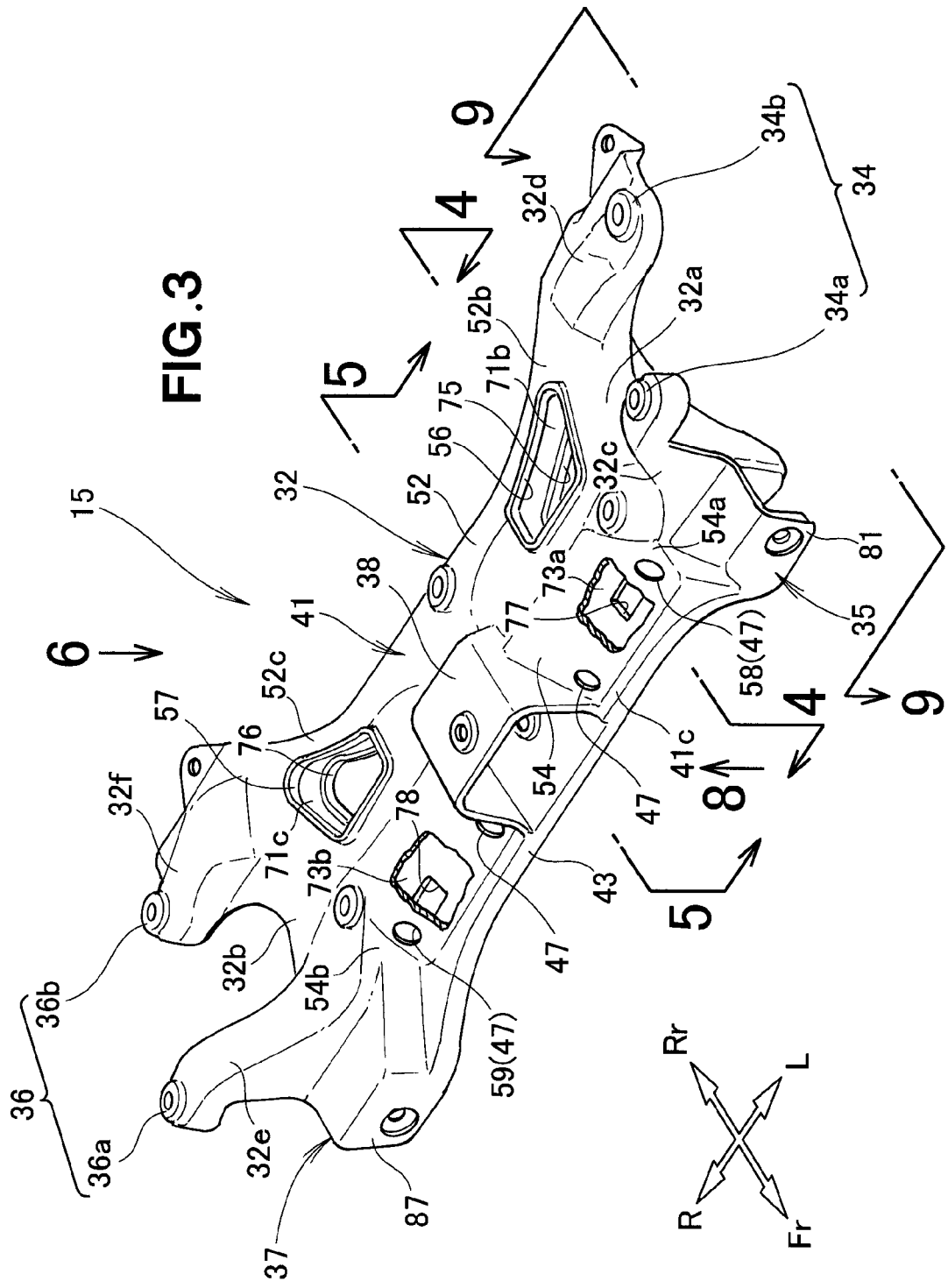
FIG. 3 is a perspective view of the subframe shown in FIG. 1.
Figure 4:
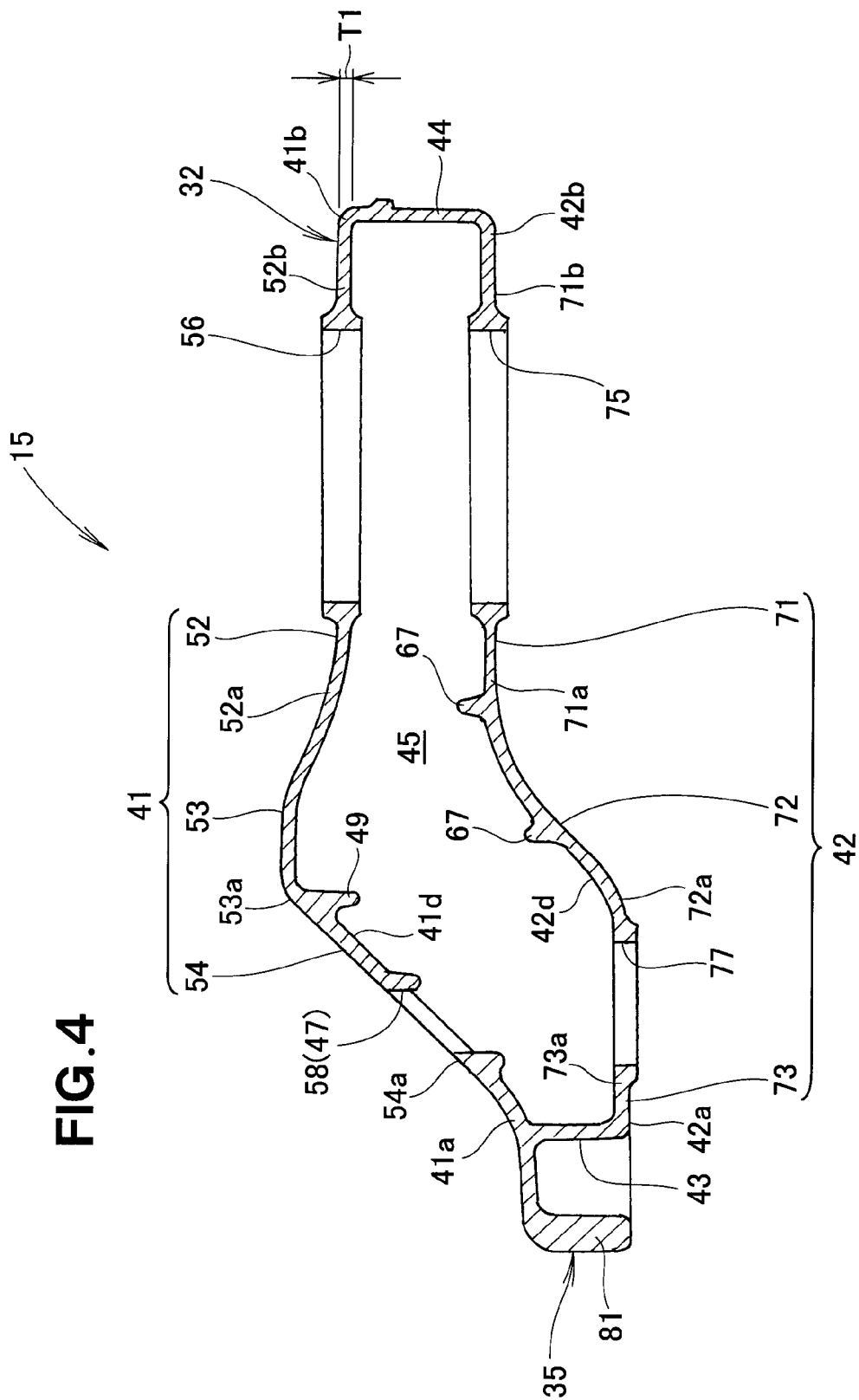
FIG. 4 is a cross-sectional view taken along line 4-4 of FIG. 3.
Figure 18:
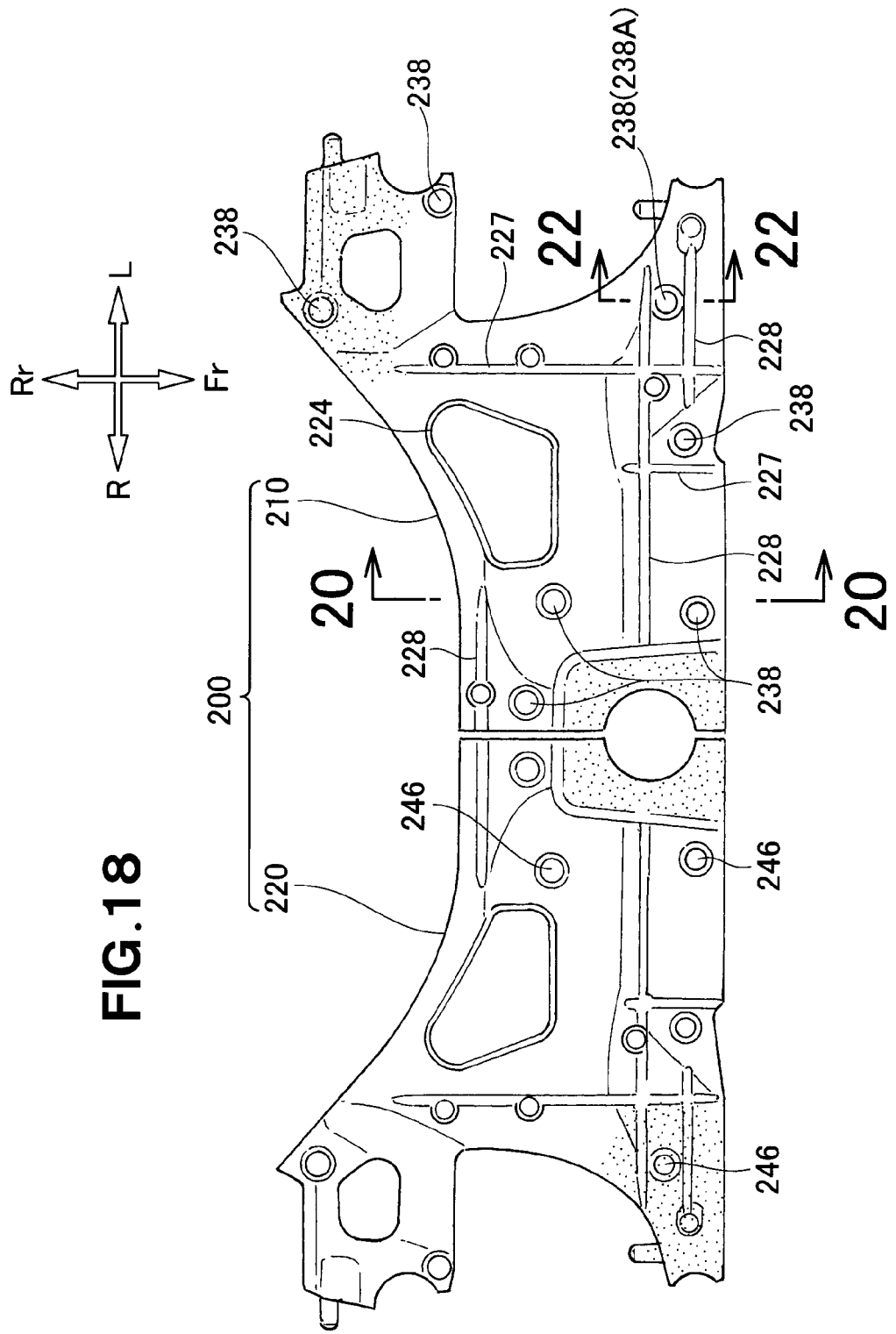
FIG. 18 is a plan view showing a core unit according to the present invention.

As shown in FIGS. 3 and 4, the subframe 15 is formed from aluminum alloy into a unitary structure having a wall thickness T1 through a high-pressure casing process using a core unit 200 (FIGS. 13 and 18). The subframe 15 includes a main body or body 32, a left vehicle-body attachment portion 34 and a left suspension support portion 35 that are provided at a left end 32a of the body 32, a right vehicle body attachment portion 36 and a right suspension support portion 37 that are provided at right end 32b of the body 32, and a central connecting portion 38 provided at a front central part of the body 32 (for connection with a connecting member).

The left vehicle-body attachment portion 34 includes a left front attachment portion 34a provided at a front part 32c of the left end 32a of the body 32, and a left rear attachment portion 34b provided at a rear part 32d of the left end 32a of the body 32. Like the left vehicle-body attachment portion 34, the right vehicle-body attachment portion 36 includes a right front attachment portion 36a provided at a front part 32e of the right end 32b of the body 32, and a right rear attachment portion 36b provided at a rear part 32f of the right end 32b of the body 32.

The left front attachment portion 34a and the left rear attachment portion 34b are bolted to the left side frame 11 (FIG. 1). Similarly, the right front attachment portion 36a and the right rear attachment portion 36b are bolted to the right side frame 12 (FIG. 1). Thus, the subframe 15 is attached crosswise between the left and right side frames 11, 12, as shown in FIG. 1.

Referring again to FIGS. 3 and 4, the body 32 includes a top or top wall 41 on an upper side thereof, a bottom or bottom wall 42 on a lower side thereof, a front wall 43 connecting front ends of the top wall 41 and the bottom wall 42, and a rear wall 44 connecting rear ends of the top wall 41 and the bottom wall 42. The body 32 has a hollow part 45 formed jointly by the top wall 41, the bottom wall 42, the front wall 43 and the rear wall 44. The top wall 41 and the bottom wall 42 are spaced from each other in a vertical direction at a predetermined interval.

The top wall 41 has a plurality of upper holding pin holes 47 formed along an outer periphery 41 thereof (only those upper holding pin holes 47 which are formed along a front part of the outer periphery 41 being shown). The upper holding pin holes 47 are formed by a corresponding number of top core holding pins (core support portions) 253 (FIG. 24) used for supporting the core unit 200 during cast-molding.

Figure 5:
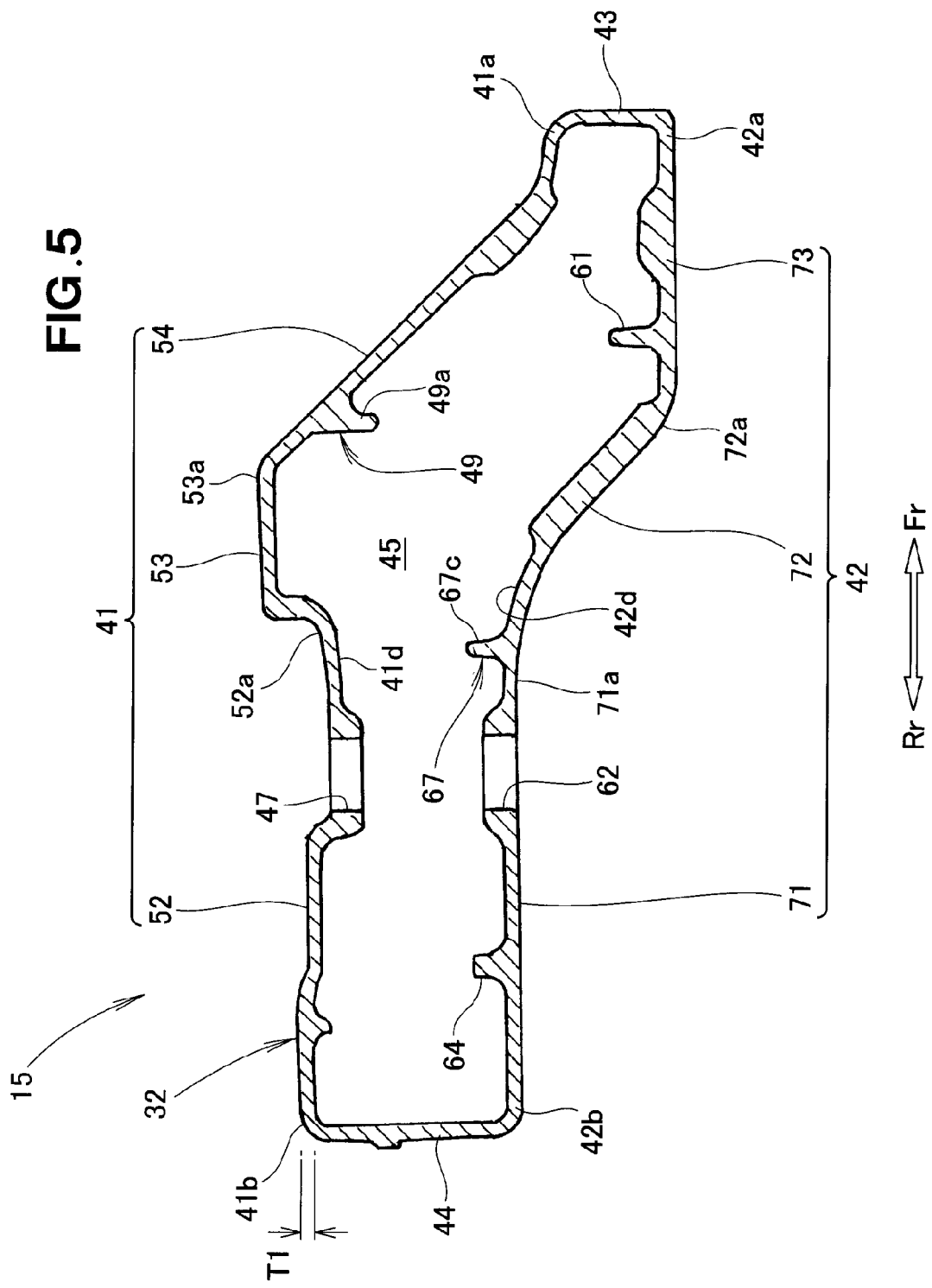
FIG. 5 is a cross-sectional view taken along line 5-5 of FIG. 3.
Figure 6:
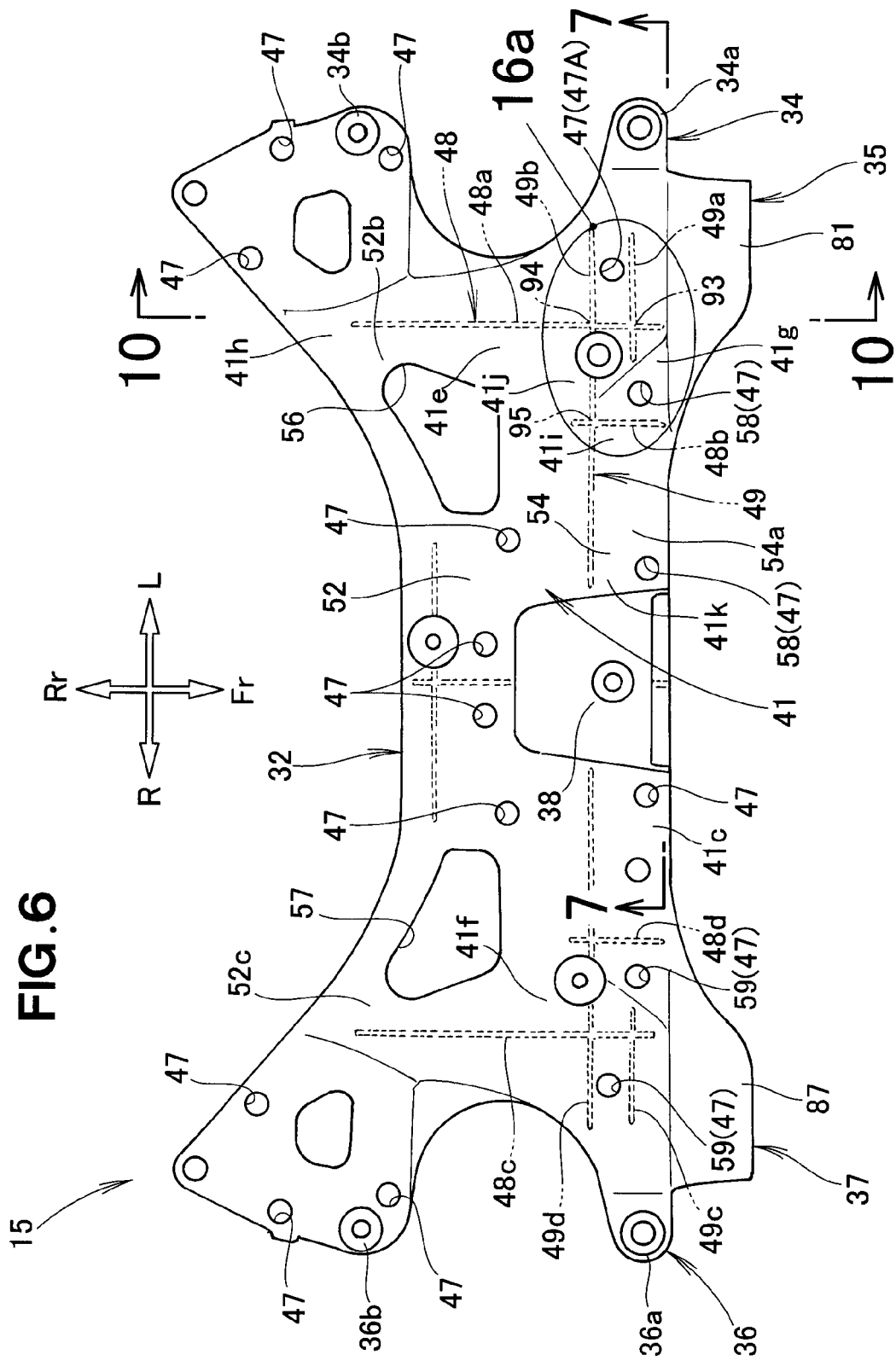
FIG. 6 is a view taken in the direction of arrow 6 of FIG. 3.

The top wall 41 includes a plurality of top longitudinal ribs 48 (FIG. 6) and a plurality of top lateral ribs 49 that are provided on an inner surface 41d of the top wall 41 for reinforcing the subframe 15. As shown in FIGS. 5 and 6, the top longitudinal ribs 48 project from the inner surface 41d into the hollow part 45 and extend in the front-and-rear or longitudinal direction of the vehicle. The top lateral ribs 49 protrude from the inner surface 41d into the hollow part 45 and extend in a width or lateral direction of the vehicle.

The top wall 41 includes a top parallel section 52 formed substantially horizontally at a rear part thereof in the front-and-rear direction of the vehicle, a raised section 53 formed at a front end 52a of the top parallel section 52, and a top inclined section 53 obliquely formed at a front end 53a of the raised section 53.

The top parallel section 52 has a left top sand eliminating opening (top opening) 56 formed near a left end 52a thereof, and a right top sand eliminating opening (top opening) 57 formed near a right end 52b thereof. The left top sand eliminating opening 56 and the right top sand eliminating opening 57 are openings which are provided in order to remove the core unit 200 (FIG. 13) from the hollow part 45 of the subframe 15 to the outside of the subframe 15.

As shown in FIG. 3, the top inclined section 54 is provided at a front part of the top wall 41 in the front-and-rear direction of the vehicle, the top inclined section 54 being downward inclined from the rear side of the vehicle to the front side of the vehicle. The top inclined section 54 has a left top inclined opening 58 formed near a left end 54a thereof located forwardly of the left top sand eliminating opening 56 in the front-and-rear direction of the vehicle, and a right top inclined opening 59 formed near a right end 54b thereof and located forwardly of the right top sand eliminating opening 57 in the front-and-rear direction of the vehicle.

The left inclined opening 58 and the right inclined opening 59 are two of the plural bottom holding pin holes 47. To facilitate understanding of the structure, these two pin holes 47 will be described below as being the left and right top inclined openings 58, 59.

Figure 8:
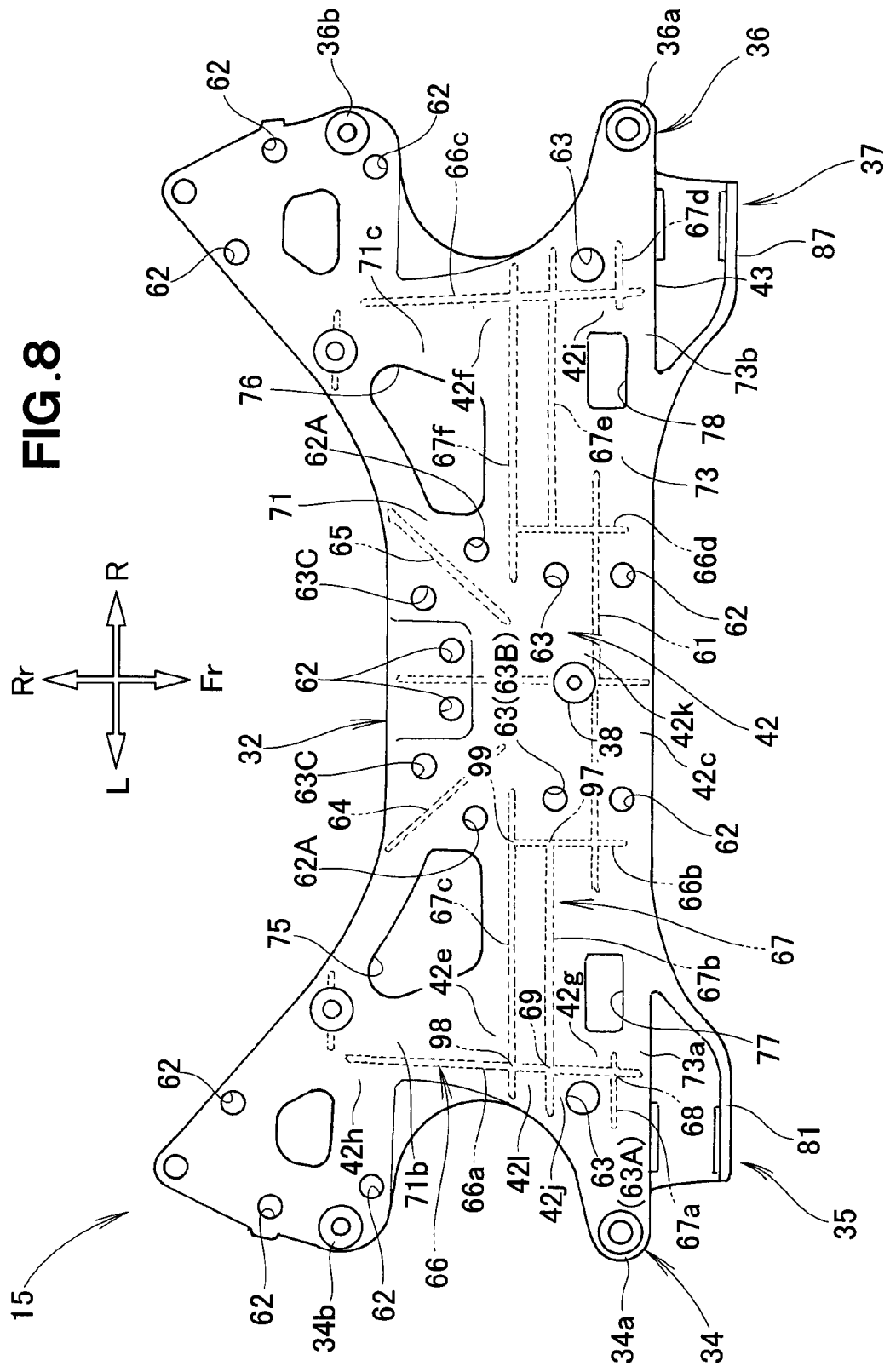
FIG. 8 is a view in the direction of arrow 8 of FIG. 3.
Figure 14:
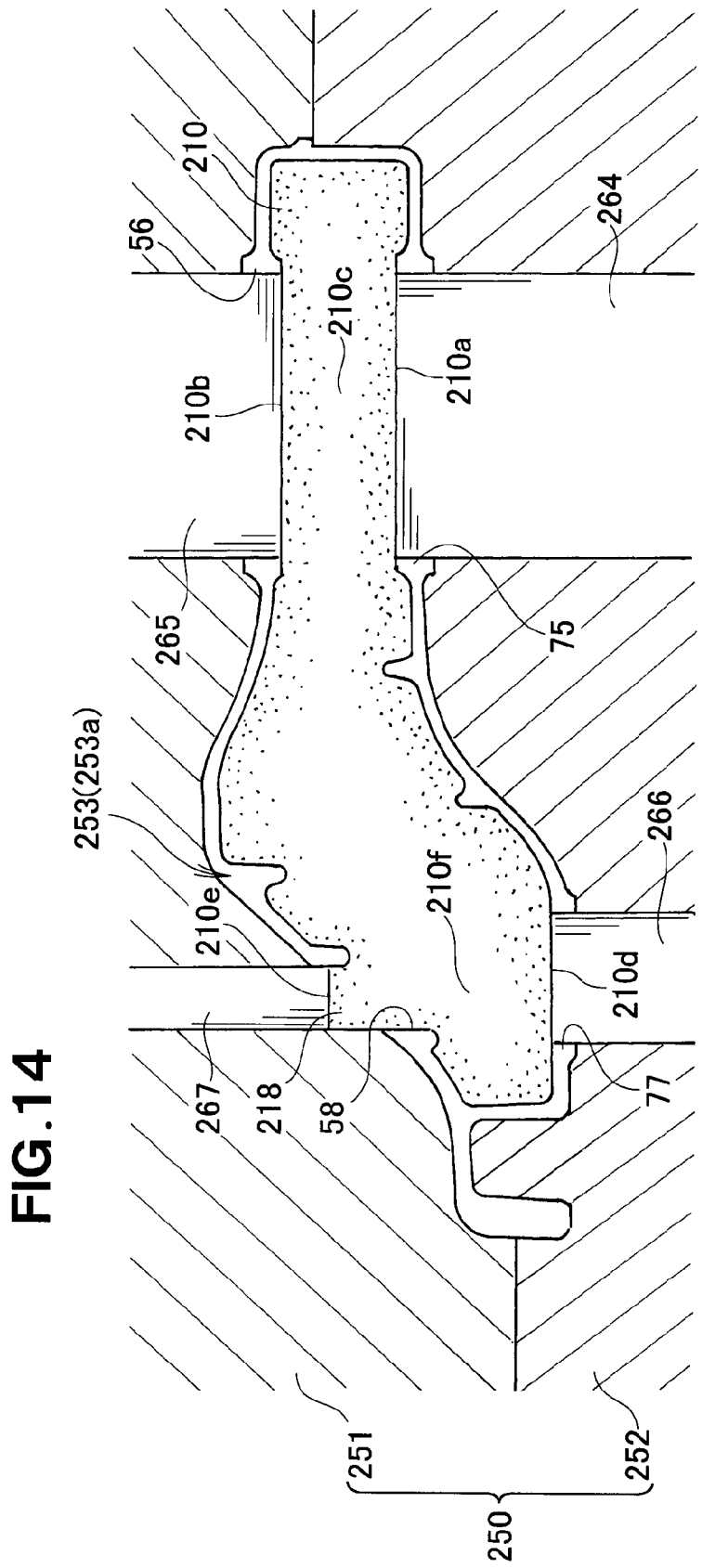
FIG. 14 is a cross-sectional view illustrative of the manner in which the core broken along line 7-7 of FIG. 6 is set in a casting mold.

As shown in FIG. 8, the bottom wall 42 has a plurality of bottom holding pin holes 62 and a plurality of core print openings 63 formed along an outer periphery 42c thereof. The lower holding pin holes 62 are formed by a corresponding number of lower core holding pins (core support portions) used for supporting the core unit 200 (FIG. 13) during cast-molding. The core print openings 93, as shown in FIG. 14, are formed by a corresponding number of core prints (core supporting portions) 235 (FIG. 19) used for supporting the core unit 200 during cast-molding.

Figure 7:
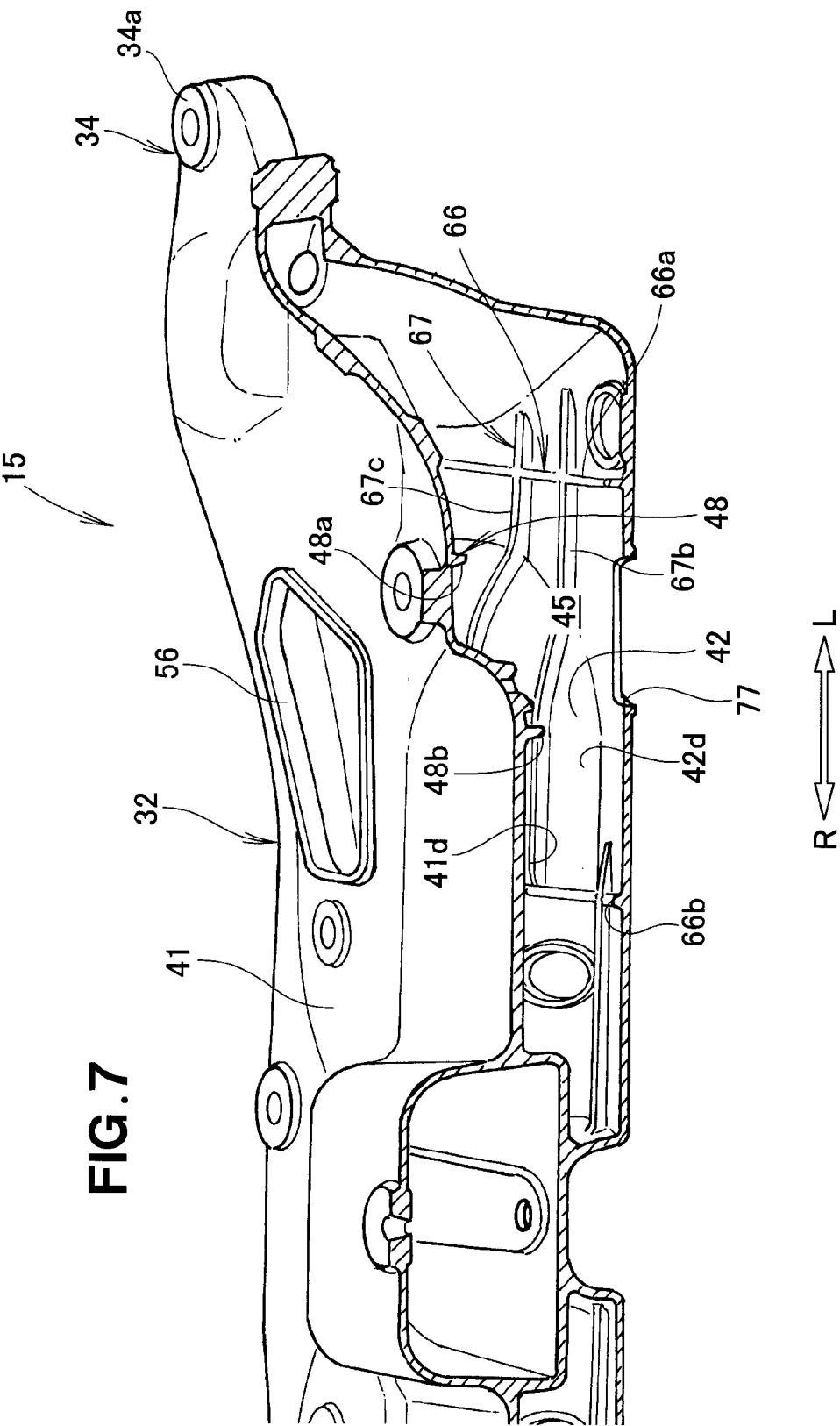
FIG. 7 is a perspective view with parts broken along line 7-7 of FIG. 6.

As shown in FIGS. 7 and 8, the bottom wall 42 has a plurality of bottom longitudinal ribs 66 and a plurality of bottom lateral ribs 67 that are provided on an inner surface 42*d* of the bottom wall 42 for reinforcing the subframe 15. The bottom longitudinal ribs 66 project from the inner surface 42*d* into the hollow section 45 and extend in the front-and-rear direction of the vehicle. As shown in FIGS. 5 and 8, the bottom lateral ribs 67 project from the inner surface 42*d* into the hollow section 45 and extend in the width direction of the vehicle.

The bottom wall 42 includes a bottom rear parallel section (bottom parallel section) 71 formed substantially horizontally at a rear part thereof in the front-and-rear direction of the vehicle, a bottom inclined section 72 formed at a front end 71*a* of the bottom rear parallel section 71, and a bottom front parallel section (bottom parallel section) 73 formed substantially horizontally at a front end 72*a* of the bottom inclined section 72. The top parallel section 52 is disposed above the bottom rear parallel section 71 in opposed relation with a prescribed space defined therebetween. The top parallel section 52 and the bottom rear parallel section 71 are formed so as to be substantially parallel to each other in the front-and-rear direction of the vehicle.

As shown in FIG. 8, the bottom rear parallel section 71 has a left bottom rear sand eliminating opening (bottom opening) 75 formed near a left end 71*b* thereof, and a right bottom rear sand eliminating opening (bottom opening) 76 formed near a right end 71*c* thereof shown in FIG. 3. The left bottom rear sand eliminating opening 75 is formed, at a part of the bottom rear parallel section 71 which is opposed to the left top sand eliminating opening 56, into a shape equivalent to a shape of the left top sand eliminating opening 56. The right bottom rear sand eliminating opening 76 is formed, at a part of the bottom rear parallel section 71 which is opposed to the right top sand eliminating opening 57, into a shape equivalent to a shape of the right top sand eliminating opening 57. Like the left and right top sand eliminating openings 56, 57, the left and right bottom rear sand eliminating openings 75, 76 are openings which are provided in order to remove the core unit 200 from the hollow part 45 of the subframe 15 to the outside of the subframe 15.

The bottom front parallel section 73 is provided at a part of the bottom wall 42 which is located at a front part of the bottom wall 42 and which is opposed to the top inclined section 54. The bottom front parallel section 73 is formed substantially horizontally. The bottom front parallel section 73 has a left bottom front sand eliminating opening (front opening) 77 formed near a left end 73*a* thereof and located forwardly of the left bottom rear sand eliminating opening 75 in the front-and-rear direction of the vehicle, and a right bottom front sand eliminating opening (front opening) 78 formed near a right end 73*b* and located forwardly of the right bottom rear sand eliminating opening 76 in the front-and-rear direction of the vehicle.

The left bottom front sand eliminating opening 77 is formed at a part of the bottom wall 42 (specifically, the bottom front parallel section 73) which is opposed to the left top inclined opening 58 (FIG. 3). The right bottom front sand eliminating opening 78 is formed at a part of the bottom wall 42 (specifically, the bottom front parallel section 73) which is opposed to the right top inclined opening 59. The bottom front parallel section 73 is provided at a part of the bottom wall 42 which is located at a front part of the bottom wall 42 and which is opposed to the top inclined section 54. The bottom front parallel section 73 is formed substantially horizontally. The bottom front parallel section 73 has the right bottom front sand eliminating opening 78 formed near the left end 73 thereof and located forwardly of the left bottom rear sand eliminating opening 75 in the front-and-rear direction of the vehicle. Like the left and right top sand eliminating openings 56, 57, the left and right bottom front sand eliminating openings 77, 78 are openings which are provided in order to remove the core unit 200 (FIGS. 11A-11B) from the hollow part 45 of the subframe 15 to the outside of the subframe 15.

As shown in FIGS. 1 and 2, the left suspension support portion 35 includes a left front connecting part 81 provided at the front part 32*c* of the left end 32*a* of the body 32, and a left rear connecting part 82 provided at the rear part 32*d* of the left end 32*a* of the body 32.

The left front connecting part 81 is provided to protrude from the front part 32*c* in a forward direction of the vehicle and hence is located forwardly of the left front attachment portion 34*a*. The left rear connecting part 82 is provided inwardly of the left rear attachment portion 34*b* (FIG. 3) in the vehicle width direction and hence is disposed between the left rear attachment portion 34*b* and the rear part 32*d*. A front attachment part 16*a* of the left suspension arm 16 is connected to the left front connecting part 81 via a left front support pin 84. A rear attachment part 16*b* of the left suspension arm 16 is connected to the left rear connecting part 82 via a left rear support pin.

The left suspension has a lower end 21*a* connected to the left suspension arm 16 and an upper end 21*b* connected to a left damper housing 13. The left damper housing 13 is formed integrally with the left side frame 11. The left suspension 21 is thus supported on the left suspension arm 16. The left suspension 21 is therefore supported on the left suspension support portion 35 via the left suspension arm 16.

Like the left suspension support portion 35, the right suspension support portion 37 includes a right front connecting part 87 provided at the front part 32*e* of the right end 32*b* of the body 32, and a right rear connecting part 88 provided at the rear part 32*f* of the right end 32*b* of the body 32.

The right front connecting part 87 is provided to protrude from the front part 32*e* in a forward direction of the vehicle and hence is located forwardly of the right front attachment portion 36*a*. The right rear connecting part 88 is provided inwardly of the right rear attachment portion 36*b* (FIG. 3) in the vehicle width direction and hence is disposed between the right rear attachment portion 36*b* and the rear part 32*f*. A front attachment part 17*a* of the right suspension arm 17 is connected to the right front connecting part 87 via a right front support pin 91. A rear attachment part 17*b* of the right suspension arm 17 is connected to the right rear connecting part 88 via a right rear support pin.

The right suspension arm 17 is a member which is substantially bilaterally symmetrical with the left suspension arm 16. A lower end 22*a* of the right suspension 22 is connected to the right suspension arm 17, and an upper end 22*a* of the right suspension 22 is connected to a right damper housing 14. The right damper housing 14 is formed integrally with the right side frame 12. The right suspension 22 is thus supported on the right suspension support portion 37 via the right suspension arm 17.

As shown in FIGS. 2 and 3, the central connecting portion 38 is provided at a center in the vehicle width direction of the body 32 and located in a front half of the body 32 (i.e., a front portion in the front-and-rear direction of the vehicle). The torque rod 26 has a proximal end 26a connected to the central connecting portion 38 by a bolt 51 (FIG. 1) and a nut 52. Thus, the power plant 25 is supported by the torque rod 26.

Next, the top longitudinal ribs 48 and the top lateral ribs 49 that are provided on the body 32 (top wall 41) and the bottom longitudinal ribs 66 and the bottom lateral ribs 67 that are provided on the body 32 (bottom wall 42) will be described in greater detail.

As shown in FIG. 6, the top longitudinal ribs 48 include a left outer top longitudinal rib 48a and a left inner top longitudinal rib 48b which are provided at a left end portion 41e of the top wall 41, and a right outer top longitudinal rib 48c and a right inner longitudinal rib 48d which are provided at a right end portion 41f of the top wall 41. These top longitudinal ribs 48a-48d extend in the front-and-rear or longitudinal direction of the vehicle.

The left outer top longitudinal rib 48a is provided at a front part 41g of the left end portion 41e of the top wall 41 which is adjacent to the left suspension support portion 35 (left front connecting part 81), the left outer top longitudinal rib 48a extending from the front part 41g to a rear part 41h of the left end portion 41e of the top wall 41 in a rearward direction of the vehicle. The left outer top longitudinal rib 48a intersects with a left front top lateral rib 49a and a left rear top lateral rib 49b.

The left inner top longitudinal rib 48b is provided at a part 41i of the left end portion 41e of the top wall 41 which is adjacent to the left suspension support portion 35 (left front connecting part 81) and which is located inwardly of the left outer top longitudinal rib 48a in the vehicle width direction. The right outer top longitudinal rib 48c and the right inner top longitudinal rib 48d are members which are laterally symmetrical with the left outer top longitudinal rib 48a and the left inner top longitudinal ribs 48b, respectively, and a detailed description of these members can be omitted.

The top lateral ribs 49 include the left front top lateral rib 49a provided at the part 41g of the top wall 41 (left end portion 41e) which is adjacent to the left front connecting part 81, the left rear top lateral rib 49b disposed rearwardly of the left front top lateral rib 49a in the front-and-rear direction of the vehicle, a right front top lateral rib 49c provided at the right connecting part 87 of the top wall 41 (right end portion 41f), and a right rear top lateral rib 49d disposed rearwardly of the right front top lateral rib 49 in the front-and-rear direction of the vehicle. These top lateral ribs 49a-49d extend in the vehicle width direction.

The left front top lateral rib 49a is provided at the part 41g of the left and portion 41e of the top wall 41 which is adjacent to the left suspension support portion 35 (left front connecting part 81). More specifically, the left front top lateral rib 49a is provided at a section of the part 41g which is separated from the front wall 43 in a rearward direction of the vehicle. In other words, the left front top lateral rib 49a is a rib which extends parallel to the left rear top lateral rib 49b and which is spaced at a predetermined distance from the left rear top lateral rib 49b in the rearward direction of the vehicle. The left front top lateral rib 49a and the left outer top longitudinal rib 48a cross each other at a top intersection 93.

The left rear top lateral rib 49b is provided at a part 41j of the left end portion 41e of the top wall 41 which is adjacent to the left suspension support portion 35 (left front connection part 81) and which is rearward of the left front top lateral rib 49a in the front-and-rear direction of the vehicle. The left rear top lateral rib 49b extends from the part 41j to a laterally central portion 41k in the vehicle width direction. The left rear top lateral rib 49b and the left outer top longitudinal rib 45a cross each other at a top outer intersection 94, and the left rear top lateral rib 49b and the left inner top longitudinal rib 49b cross each other at a top inner intersection 95.

In other words, the left rear top lateral rib 49b extends from the central connecting portion 38 toward a lateral outward portion of the body 32. Specifically, the left rear top lateral rib 49b extends from the central connecting portion 38 in a lateral outward direction of the vehicle toward the left suspension support portion 35. With this arrangement, a load inputted to the central connecting portion 38 and a load inputted to the left suspension support portion 35 can be efficiently supported or borne by the left rear top lateral rib 49b, and sufficient rigidity and strength of the subframe 15 can be ensured.

Furthermore, the upper holding pin hole 47 (represented by reference character 47A for easy understanding), which is formed by the top core holding pin 253 (FIG. 24) used for supporting the core unit 200 (FIG. 18), is disposed near the left rear top lateral rib 49b. With this arrangement, the rib 49b is able to prevent the upper holding pin hole 47A from forming a starting point of stress concentration when the upper holding pin hole 47A is subjected to a load. Thus, the upper holding pin hole 47A formed by the top core holding pin 253 can never lead to a reduction in the rigidity and strength of the subframe 15.

By virtue of the left rear top lateral rib 49b provided for reinforcing the upper holding pin hole 47A, it is possible to provide the top core holding pin 253 (FIG. 24) at a position adjacent to the left suspension support portion 35. The top core holding pin 253 can thus be located at an appropriate position. This will ensure that in the production of the subframe 15 by cast-molding, the core unit 200 (FIG. 18) can be properly supported by the top core holding pin 253 so that a produced subframe 12 has a uniform wall thickness.

The left rear top lateral rib 49b and the left outer top longitudinal rib 48a cross each other at the top outer intersection 94, and the left rear top lateral rib 49b and the left inner top longitudinal rib 48b cross each other at the top inner intersection 95. The right front top lateral rib 49c and the right rear top lateral rib 49d are members which are laterally symmetrical with the left front top lateral rib 49a and the left rear top lateral rib 49b, respectively, and a detailed description of these members can be omitted.

Figure 9:
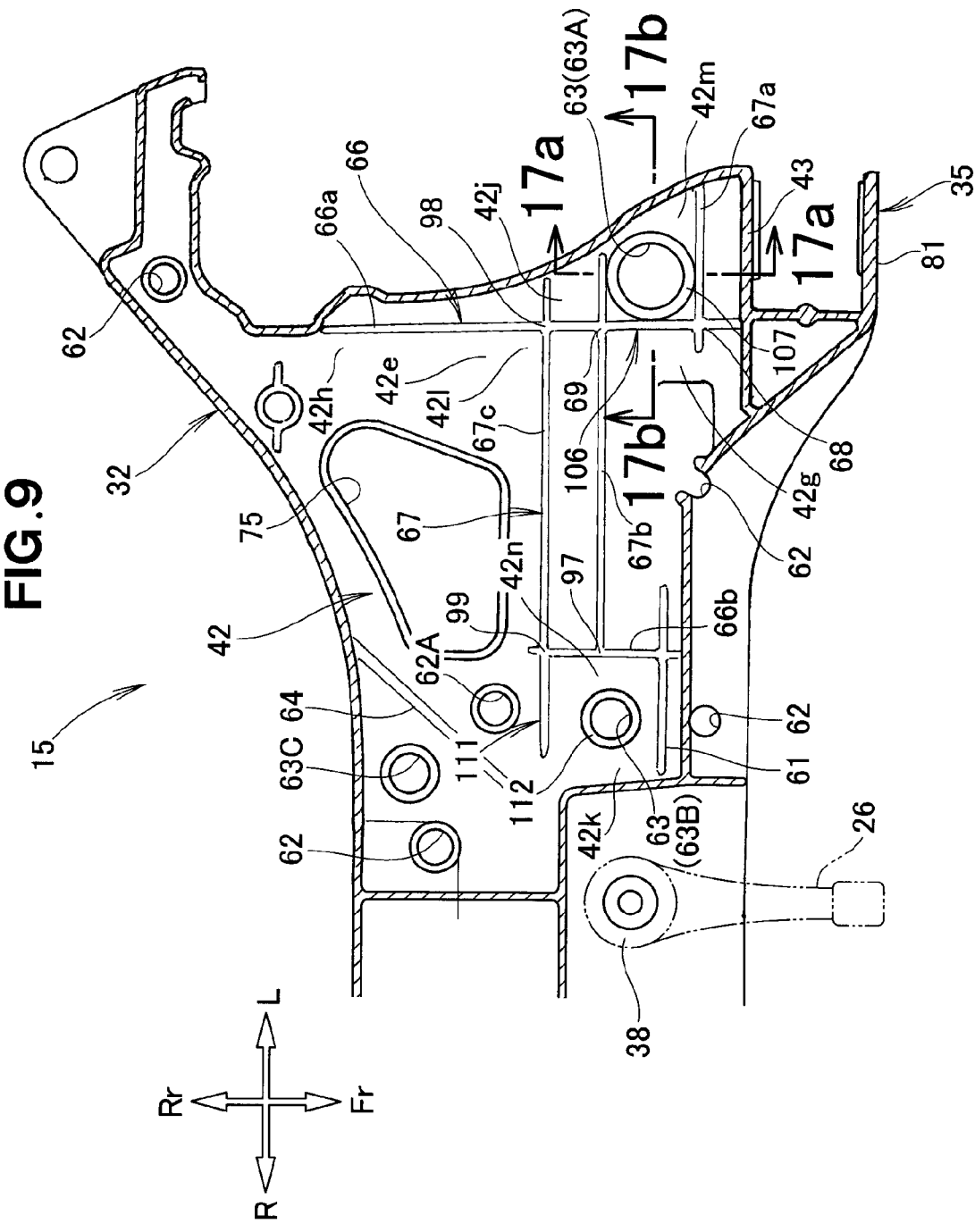
FIG. 9 is a cross-sectional view taken along line 9-9 of FIG. 3.

As shown in FIGS. 8 and 9, the bottom longitudinal ribs 66 include a left outer bottom longitudinal rib 66a provided at a left end portion 42e of the bottom wall 42, a left inner bottom longitudinal rib 66b provided inwardly of the left outer bottom longitudinal rib 66a in the vehicle width direction, a right outer bottom longitudinal rib 66c provided at a right end portion 42f of the bottom wall 42, and a right inner bottom longitudinal rib 66d provided inwardly of the right outer bottom longitudinal ribs 66c in the vehicle width direction. These ribs 66a-66d extend in the front-and-rear or longitudinal direction of the vehicle.

The left outer bottom longitudinal rib 66a is provided at a front part 42g of the left end portion 42e of the bottom wall 42 which is adjacent to the left suspension support portion 35 (left front connecting part 81), the left outer bottom longitudinal rib 66a extending from the front part 42g to a rear part 42h of the left end portion 42e of the bottom wall 42 in a rearward direction of the vehicle. The left inner bottom longitudinal rib 66b is provided inwardly of the left outer bottom longitudinal rib 66a in the vehicle width direction and located near a central area 42k in the vehicle width direction (which is adjacent to the central connecting portion 38). The left inner bottom longitudinal rib 66b crosses a left rear bottom lateral rib 67c and a central bottom lateral rib 61. The left inner bottom longitudinal rib 66b is provided inwardly of the left bottom front sand eliminating opening 77 and the left bottom rear sand eliminating opening 75 in the vehicle width direction.

The right outer bottom longitudinal rib 66c and the right inner bottom longitudinal rib 66d are members which are laterally symmetrical with the left outer bottom longitudinal rib 66a and the left inner bottom longitudinal rib 66b, respectively, and a detailed description of these members can be omitted.

The bottom lateral ribs 67 include a left front bottom lateral rib 67a provided at the front part 42g of (the left end portion 42e) of the bottom wall 42, a left central bottom lateral rib 67b disposed rearwardly of the left front bottom lateral rib 67a in the front-and-rear direction of the vehicle, the left rear bottom lateral rib 67c disposed rearwardly of the left central bottom lateral rib 67b in the front-and-rear direction of the vehicle, a right front bottom lateral rib 67d disposed at a front part 42i of (the right end portion 42f) of the bottom wall 42, a right central bottom lateral rib 67e disposed rearwardly of the right front bottom lateral rib 67d in the front-and-rear direction of the vehicle, and a right rear bottom lateral rib 67f disposed rearwardly of the right central bottom lateral rib 67e in the front-and-rear direction of the vehicle. These bottom lateral ribs 67a-67f extend in the lateral or width direction of the vehicle.

The left front lateral rib 67a is provided at the front part 42e of the left end portion 42e of the bottom wall 42 which is adjacent to the left suspension support portion 35 (left front connecting part 81) and which is slightly spaced from the front wall 43 in the rearward direction of the vehicle. The left front bottom rib 67a and the left outer bottom longitudinal rib 66a cross each other at a bottom front intersection 68.

The left central bottom lateral rib 67b is disposed at a part 42j of the left end portion 42e of the bottom wall 42 which is adjacent to the left suspension support portion 35 (left front connecting part 81) and which is rearward of the left front bottom rib 67a in the front-and-rear direction of the vehicle. The left central bottom lateral rib 67b extends from the part 42j of the left end portion 42e to the vicinity of the central area 42k (FIG. 9) in the vehicle width direction. The left central bottom lateral rib 67b and the left outer bottom longitudinal rib 66a cross each other at a bottom central outer intersection 69. The left central bottom lateral rib 67b and the left inner bottom longitudinal rib 66b cross each other at a bottom central inner intersection 97.

The left rear bottom lateral rib 67c is provided at a part 42l which is offset from the left central bottom lateral rib 67 in a rearward direction of the vehicle. Furthermore, the left rear bottom lateral rib 67c extends from the part 42l to the vicinity of the central area 42k in the vehicle width direction. In other words, the left rear bottom lateral rib 67c extends from the central connecting portion 38 in a lateral outward direction of the body 32. The left outer bottom lateral rib 67c and the left outer bottom longitudinal rib 66a cross each other at a bottom rear outer intersection 98. The left rear bottom lateral rib 67c and the left inner bottom longitudinal rib 66b cross each other at a bottom rear inner intersection 99. With this arrangement, a load inputted to the central connecting portion 38 can be efficiently supported by the left rear bottom lateral rib 67c, and sufficient rigidity and strength of the subframe 15 can be ensured.

The core print opening 63 (represented by reference character 63B for easy understanding) is disposed adjacent to the left rear bottom lateral rib 67c. With this arrangement, the left rear bottom lateral rib 67c is able to prevent the core print opening 63B from forming a starting point of stress concentration when a load is inputted from the central connecting portion 38. The core print opening 63b can never cause a reduction in the rigidity and strength of the subframe 15.

By virtue of the left rear bottom lateral rib 67c provided for reinforcing the core print opening 63B, it is possible to provide a lower core holding pin at a suitable position adjacent to the central connecting portion 38. This will ensure that in the production of the subframe 15 by castmolding, the core unit 200 (FIG. 18) can be properly supported by the lower core holding pins such that a produced subframe 12 has a uniform wall thickness.

The left rear bottom lateral rib 67c and the left outer bottom longitudinal rib 66a cross each other at the bottom rear outer intersection 98, and the left rear bottom lateral rib 67c and the left inner bottom longitudinal rib 66b cross each other at the bottom rear inner intersection 99. The right front bottom lateral rib 67d, the right central bottom lateral rib 67e, and the right rear bottom lateral rib 67f are members which are bilaterally symmetrical with the left front bottom lateral rib 67a, the left central bottom lateral rib 67b, and the left rear bottom lateral rib 67c, respectively, and a detailed description of these members can be omitted.

The bottom wall 42 of the body 32 further includes left and right bottom diagonal ribs 64, 65 disposed at the central area 42k in the vehicle width direction. The left and right bottom diagonal ribs 64, 65 extend from the central connecting portion 38 toward the outside of the body 32. Specifically, the left and right bottom diagonal ribs 64, 65 are disposed on a rear half of the central area 42k and extend divergently from lateral outward positions of the central connecting portion 38 in the rearward direction of the vehicle. By virtue of the left and right bottom diagonal ribs 64, 65 provided to extend from the central connecting portion 38 toward the outside of the body 32, a load inputted to the central connecting portion 38 can be supported or borne by the left and right bottom diagonal ribs 64, 65.

One of the bottom holding pin openings 62 (represented by reference character 62A for easy understanding) and one of the core print openings 63 (represented by reference character 63C for easy understanding) are disposed near both sides of each of the left and right bottom diagonal rib 64, 65. The thus arranged left and right bottom diagonal ribs 64, 65 can eliminate a risk that any one of the bottom holding pin holes 62A and the core print openings 63C forms a starting point of stress concentration when subjected to a load inputted from the central connecting portion 38. The bottom holding pin holes 62A and the core print openings 63C can never cause a reduction in the rigidity and strength of the subframe 15.

Furthermore, the left and right bottom diagonal ribs 64, 65 are able to reinforce the bottom holding pin holes 62A and the core print openings 63C. Especially, the left bottom holding pin hole 62A is surrounded by the left bottom diagonal rib 64 and the left rear bottom lateral rib 67c, so that a further suitable reinforcement can be attained. Similarly, the right bottom holding pin hole 62A is surrounded by the right bottom diagonal rib 65 and the right rear bottom lateral rib 67f, so that a further suitable reinforcement can be attained. With this arrangement, because in the production of the subframe by cast-molding, the core unit 200 (FIG. 18) can be held appropriately in position by the lower core holding pins and the core prints, it is possible to make the thickness of a produced subframe 15 uniform.

The bottom wall 42 of the body 32 further includes the central bottom lateral rib 61 provided forwardly of the left and right bottom diagonal ribs 64, 65 in the front-and-rear direction of the vehicle. The central bottom lateral rib 61 is disposed at a front part of the central area 42k in the vehicle width direction and extends in the vehicle width direction. The central bottom lateral rib 61 is a rib which extends parallel to the left rear bottom lateral rib 67c and the right rear bottom lateral rib 67f and which is spaced a prescribed distance from the left and right bottom lateral ribs 67c, 67f in the front-and-rear direction of the vehicle.

As shown in FIGS. 6 and 8, the left outer top longitudinal rib 48a, the left inner top longitudinal rib 48b, the left front top lateral rib 49a and the left rear top lateral rib 49b are provided at the part 41g of the left end portion 41e of the top wall 41, which is adjacent to the left suspension support portion 35 (left front connecting part 81). The part 41g of the top wall 41 can thus be reinforced by the top longitudinal ribs 48a, 48b and the top lateral ribs 49a, 49b.

Furthermore, the left outer bottom longitudinal rib 66a, the left front bottom lateral rib 67a and the left central bottom lateral rib 67b are provided at the part 42g of the left end portion 42e of the bottom wall 42, which is adjacent to the left suspension support portion 35 (left front connecting part 81). The part 42g of the bottom wall 42 can thus be reinforced by the bottom longitudinal rib 66a and the bottom lateral ribs 67a, 67b.

By thus reinforcing the part 41g of the top wall 41 and the part 42g of the bottom wall 42, sufficient rigidity and strength of the subframe 15 (particularly, that part of the subframe which supports the left front connecting part 81 of the left suspension support portion 35) can be ensured. This will ensure that the subframe 15 can properly support or bear a load inputted to the left front connecting part 81 from the front attachment part 16a (FIG. 2) of the left suspension arm 16.

That part of the subframe 15 which is adjacent to the right suspension support portion 37 (right front connecting part 87) is reinforced by the top longitudinal ribs 48c, 48d, the top lateral ribs 49c, 49d, the bottom longitudinal rib 66c and the bottom lateral ribs 67d, 67e in the same manner as done for the left side. With this arrangement, it is possible to secure sufficient rigidity and strength of the subframe 15 (particularly, that part of the subframe which supports the right front connecting part 87 of the right suspension support portion 37. This will ensure that the subframe can properly support or bear a load inputted to the right front connecting part 87 from the front attachment part 17a (FIG. 2) of the right suspension arm 17 in the same manner as done for the left front connecting part 81.

The part 41g of the top wall 41 includes the top intersection 93, the top outer intersection 94 and the top inner intersection 95 that are formed by the top longitudinal ribs 48a, 48b and the top lateral ribs 49a, 49b. The part 41b of the top wall 41 can thus be more suitably reinforced by the intersections 93, 94, 95. Furthermore, the part 42g of the bottom wall 42 includes the bottom front intersection 68 and the bottom central outer intersection 69 formed by the bottom longitudinal rib 66a and the bottom lateral ribs 67a, 67b. The part 42g of the bottom wall 42 can thus be more suitably reinforced by the intersections 68, 69. With this arrangement, it is possible for the subframe 15 to more properly support or bear the load inputted to the left connecting part 81 from the front attachment part 16a (FIG. 2) of the left suspension arm 16.

That part of the subframe 15 which is adjacent to the right suspension support portion 37 (right connecting part 87) is reinforced by the corresponding intersections in the same manner as done for the left side. It is therefore possible for the subframe 15 to more properly support or bear the load inputted to the right connecting part 87 from the front attachment part 17a (FIG. 2) of the right suspension arm 17.

As shown in FIG. 7, the left outer bottom longitudinal rib 66a formed on the bottom wall 42 is spaced or offset outwardly in the vehicle width direction from the left outer top longitudinal rib 48a formed on the top wall 41. The left inner bottom longitudinal rib 66b formed on the bottom wall 42 is spaced or offset inwardly in the vehicle width direction from the left inner top longitudinal rib 48b formed on the top wall 41. The left outer bottom longitudinal rib 66a and the left inner bottom longitudinal rib 66b of the bottom wall 42 are disposed alternately with the left outer top longitudinal rib 44a and the left inner top longitudinal rib 44b in the vehicle width direction.

Figure 10:
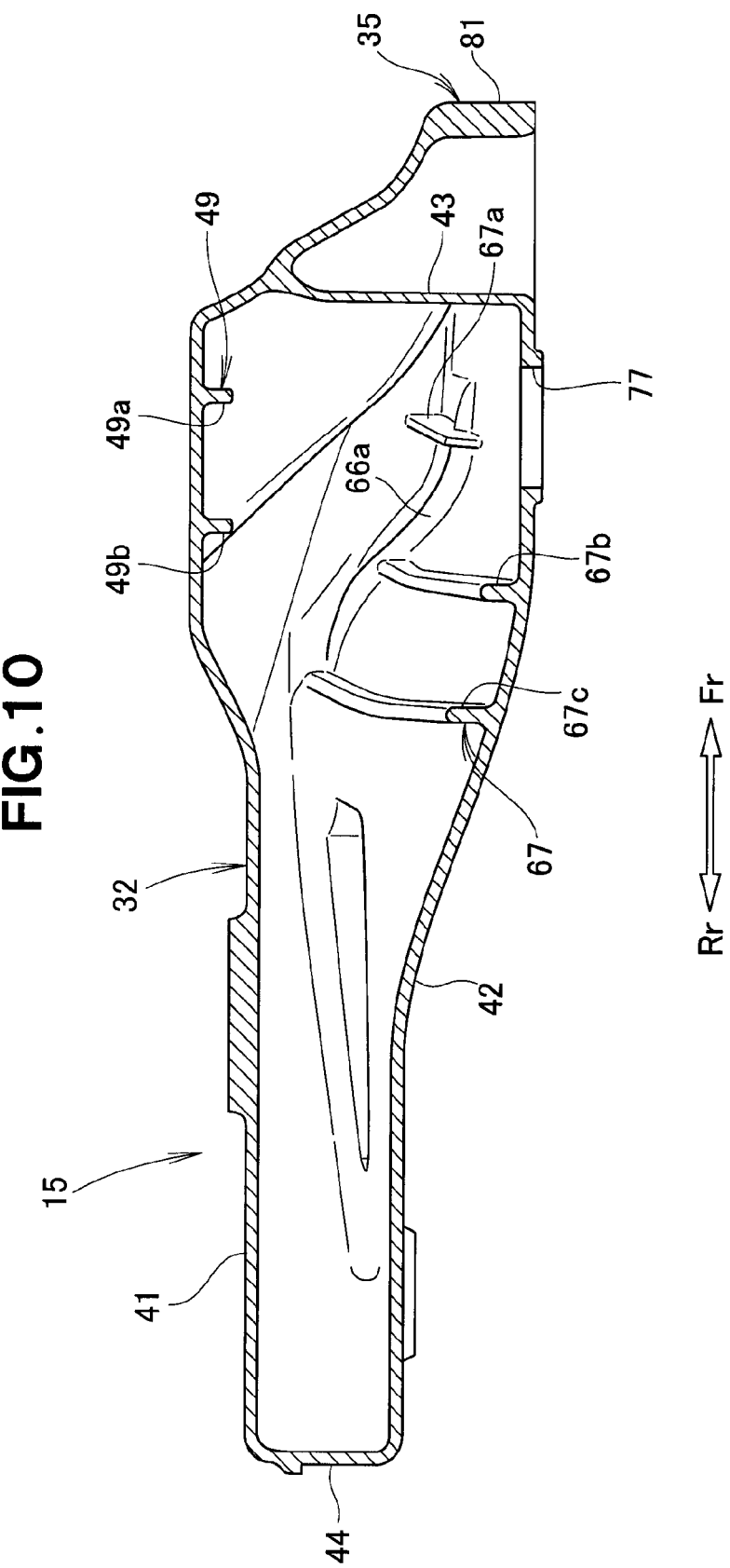
FIG. 10 is a cross-sectional view taken along line 10-10 of FIG. 6.

As shown in FIG. 10, the left front bottom lateral rib 67a formed on the bottom wall 42 is spaced or offset in a vehicle rearward direction from the left front top lateral rib 49a formed on the top wall 41. The left rear top lateral rib 49b formed on the top wall 41 is spaced or offset in the vehicle rearward direction from the left front bottom lateral rib 67a. Furthermore, the left central bottom lateral rib 67b formed on the bottom wall 42 is spaced or offset in the vehicle rearward direction from the left rear top lateral rib 49b formed on the top wall 41. The left front and rear top lateral ribs 49a, 49b and the left front, central and rear bottom lateral ribs 67a, 67b, 67c are disposed alternately with each other in the front-and-rear direction of the vehicle.

As shown in FIG. 5, the central bottom lateral rib 61 formed on the bottom wall 42 is spaced or offset in a vehicle forward direction from the left front top lateral rib 49a formed on the top wall 41. The left rear bottom lateral rib 67c formed on the bottom wall 42 is spaced or offset in the vehicle rearward direction from the left front top lateral rib 49. Furthermore, the left bottom diagonal rib 64 formed on the bottom wall 42 is spaced or offset in the vehicle rearward direction from the left rear bottom lateral rib 67c. The central bottom lateral rib 61, the left rear bottom lateral rib 67c and the left diagonal rib 64 are disposed alternately with the left front top lateral rib 64 in the front-and-rear direction of the vehicle.

As discussed above, the bottom longitudinal ribs 66a, 66b formed on the bottom wall 42 and the top longitudinal ribs 48a, 48b are disposed in an alternate way in the vehicle width direction (see FIG. 6). As shown in FIGS. 5 and 10, the bottom lateral ribs 61, 67a, 67b, 67c formed on the bottom wall 42 and the top lateral ribs 49a, 49b formed on the top wall 41 are disposed in an alternate way in the front-and-rear direction of the vehicle. Furthermore, the left diagonal rib 64 formed on the bottom wall 42 and the top lateral ribs 49a, 49b are disposed in an alternate way in the front-and-rear direction of the vehicle.

Figure 11A:
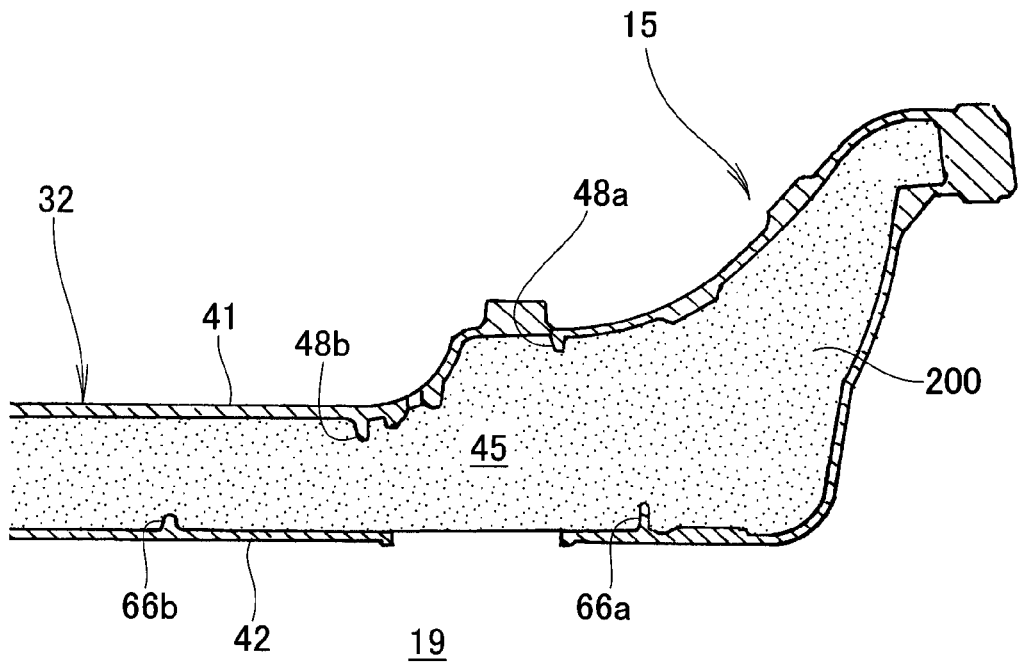
FIG. 11A is a cross-sectional view showing a state in which a core is filled in the subframe of FIG. 7.
Figure 11B:
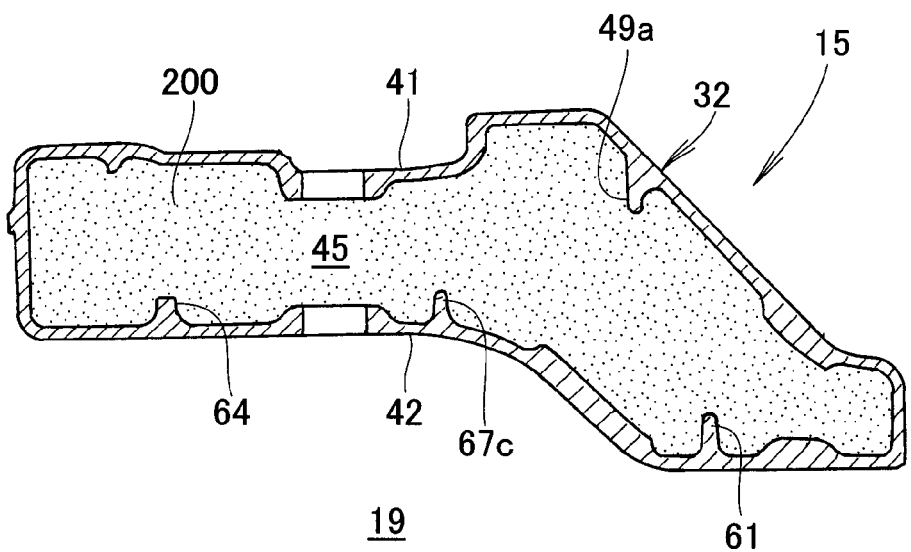
FIG. 11B is a cross-sectional view showing the core filled in the subframe of FIG. 4.
Figure 12A:
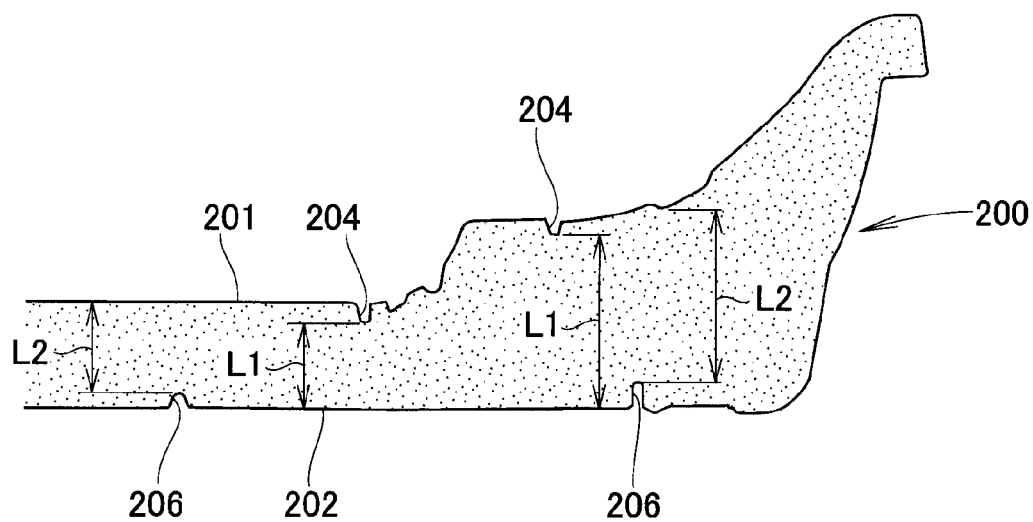
FIG. 12A is a cross-sectional view of the core shown in FIG. 11A.
Figure 12B:
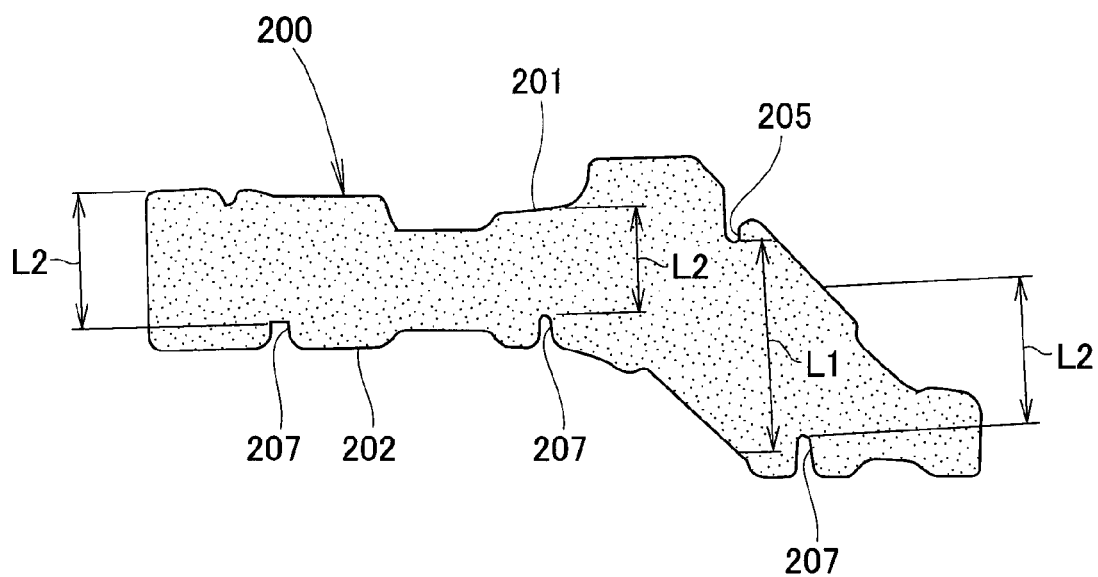
FIG. 12B is a cross-sectional view of the core shown in FIG. 11B.

As shown in FIGS. 11A-11B, at parts the subframe 15 each of which is provided with a corresponding one of the top longitudinal ribs 48a, 48b, the bottom longitudinal ribs 66a, 66b, the top lateral ribs 49a, 49b (49b shown in FIG. 10), the bottom lateral ribs 61, 67a, 67c (67a and 67b being shown in FIG. 10), the hollow part 45 can possess a large cross-sectional area S1. More specifically, the cross-sectional area S1 is larger than a cross-sectional area S2 which is obtained in the case where ribs on the top wall 41 and the ribs on the bottom wall 42 are disposed to overlap with each other.

By thus securing a large cross-sectional area S1, the core unit 200 is allowed to move smoothly without being hindered by the longitudinal ribs and the lateral ribs when the core unit 200 in the hollow part 45 is removed from the sand eliminating openings 56, 57, 75, 76, 77, 78 (FIG. 3). The core unit 200 in the hollow part 45 can thus be smoothly discharged to the outside of the subframe 15.

The top longitudinal ribs 48*a*, 48*b*, the bottom longitudinal ribs 66*a*, 66*b*, the top lateral ribs 49*a*, 49*b* and the bottom lateral ribs 61, 67*a*, 67*b*, 67*c*, 64 are each formed by a recessed longitudinal or lateral groove in the core unit 200.

As shown in FIGS. 11A-11B and 12A-12B, the core unit 200 includes a top surface 201 having 20 top longitudinal grooves 204 and top lateral grooves 205 formed therein, and a bottom surface 202 having bottom longitudinal grooves 206 and bottom lateral grooves 207 formed therein. The top longitudinal ribs 48*a*, 48*b* are formed at the longitudinal grooves 24, and the top lateral ribs 49*a*, 49*b* (49*b* being shown in FIG. 10) are formed at the top lateral grooves 205. Similarly, the bottom longitudinal ribs 66*a*, 66*b* are formed at the bottom 25 longitudinal grooves 206, and the bottom lateral ribs 61, 67*a*, 67*b*, 67*c*, 64 (67*a* and 67*b* being shown in FIG. 10) are formed at the bottom lateral grooves 207.

The top longitudinal grooves 204 in the top surface 201 and the bottom longitudinal grooves 206 in the bottom surface 202 are formed alternately with each other in the vehicle width direction. The top lateral grooves 205 in the top surface 201 and the bottom lateral grooves 207 in the bottom surface 202 are formed alternately with each other in the front-and-rear direction of the vehicle.

With this arrangement, at a part of the top surface 201 in which each of the top longitudinal and lateral grooves 204, 205 is formed, the core unit 200 can possess a large thickness L1 as compared to a case in which top and bottom grooves are formed to overlap each other. Similarly, at a part of the bottom surface 201 in which each of the bottom longitudinal and lateral grooves 206, 207 is formed, the core unit 200 can possess a large thickness L2 as compared to a case in which top and bottom grooves are formed to overlap each other. By this securing the large thicknesses L1, L2, the core unit 200 can have a large strength.

As shown in FIG. 13, the core unit 200 is formed by core sand in a state in which it is divided into a left core 210 and a right core 220. In cast-molding the subframe 15 (FIG. 3), the core unit 200 is used to ensure that the hollow part 45 (FIG. 5) is formed in the subframe 15.

The core unit 200 is formed by the left and right cores 210, 220. The left core 210 has a plurality of top longitudinal grooves 214*a* and a plurality of top lateral grooves 214*b* (only one being shown) formed in a top surface 214 thereof. By the top longitudinal grooves 214*a* and the top lateral grooves 214*b*, the top longitudinal ribs and the top lateral ribs 49 are respectively formed on a top wall 41 (FIG. 4) of the subframe 15. The left core 210 has a bottom surface 215 and a plurality of core prints provided on an outer periphery of the bottom surface 215. The left core 210 further has a plurality of top protrusions 218 formed on the top surface 214 and a plurality of bottom protrusions formed on the bottom surface 215.

When the subframe 15 is to be formed by casting, the core prints of the bottom surface 215 are supported by a movable mold 252 (FIG. 14). Similarly, the top protrusions 218 are supported by the top core holding pins 267 and the bottom protrusions are supported by bottom core holding pins. The left core 210 can thus be held in a cavity 253 (more particularly, a left half 253*a* of the cavity 253) of a casting mold 250 shown in FIG. 14.

As shown in FIGS. 3 and 4, the left top sand eliminating opening 56 and the left bottom rear sand eliminating opening 75 are provided at portions opposed to each other and have respective shapes equivalent to each other. Furthermore, the left top inclined opening 58 and the left bottom front sand eliminating opening 77 are provided at portions opposed to each other.

With this arrangement, as shown in FIGS. 13 and 14, in cast-molding the subframe, a part 210*a* of the left core 210 which corresponds to the left bottom rear sand eliminating opening 75 can be pressed by a left bottom rear holding portion 264 from the left bottom rear sand eliminating opening 75 side. Similarly, a part 210*b* of the left core 210 which corresponds to the left top sand eliminating hole 56 can be pressed by a left top holding part 265 from the left top sand eliminating hole 56 side. A rear part 210*c* of the left core 210 is subjected to equal support forces applied coaxially from below and above by the left bottom rear holding portion 264 and the left top holding portion 265.

Furthermore, a part 210*d* of the left core 210 which corresponds to the left bottom front sand eliminating opening 77 can be pressed by a left bottom front holding portion 266 from the left bottom front sand eliminating opening 77 side. Similarly, a part 210*e* (top protrusion 218) of the left core 210 which corresponds to the left top inclined opening 58 can be pressed by a top core holding pin 267 from the left top inclined opening 58 side. A front part 210*f* of the left core 210 is subjected to equal support forces applied substantially coaxially from below and above by the left bottom front holding portion 266 and the top core holding pin 267. By thus positioning the left bottom front holding portion 226 and the top core holding pin 267 in alignment with each other, the left core 210 can be suitably held without increasing the number of sand eliminating holes or openings more than necessary. The left bottom rear holding portion 264 and the left bottom front holding portion 266 are provided on the movable mold 252. The left top holding portion 265 and the top core holding pin 267 is provided on a fixed mold 251.

Since the rear part 210*c* of the left core 210 is subjected to equal support forces applied coaxially from below and above, and since the front part 210*f* of the left core 210 is subjected to equal support forces applied substantially coaxially from below and above, the left core 210 is suitably held in the cavity 253 (more particularly, the left half 253*a* of the cavity 253).

As shown in FIGS. 3 and 13, the right core 220 is a member which is substantially bilaterally symmetrical with the left core 210. When the subframe 15 is formed by casting, core prints on a bottom surface 222 are supported by the movable mold 252 (FIG. 14) in the same manner as done for the left core 210. Furthermore, a plurality of top protrusions 225 is held by a corresponding number of top core holding pins 267, and a plurality of bottom protrusions is held by a corresponding number of bottom core holding pins. The right core 220 can thus be held in a cavity 270 (more particularly a right half of the cavity 270) in the same manner as done for the left core 210 (see FIG. 14).

Furthermore, in a like manner as done for the left core 210, a rear part 220*a* of the right core 220 is subjected to equal support forces applied coaxially from below and above by a right bottom holding portion and the right top holding portion 229. Similarly, a front part 220*b* of the right core 220 is subjected to equal support forces applied substantially coaxially from below and above by a right bottom front holding portion 231 and a mating one of the top core holding pins 267. By thus positioning the right bottom front holding portion 231 and the mating top core holding pin 267 in alignment with each other, it is possible to suitably hold the right core 220 without unnecessarily increasing the number of the sand eliminating holes or openings. The right core 220 can thus be properly held in the cavity 270 (more particularly the right half of the cavity 270) of the casting mold 250 (FIG. 14).

Next, an example will be described with reference to FIG. 15, wherein the left core 210 is held in the cavity 270 (more particularly the left half 270a of the cavity 270) when a subframe 15 is to be formed by high-pressure casting using the casting mold 250. Since the left core 210 and the right core 220 are bilaterally symmetrical members, the left core 210 will be described as a representative example and a description of the right core 220 can be omitted.

Figure 15:
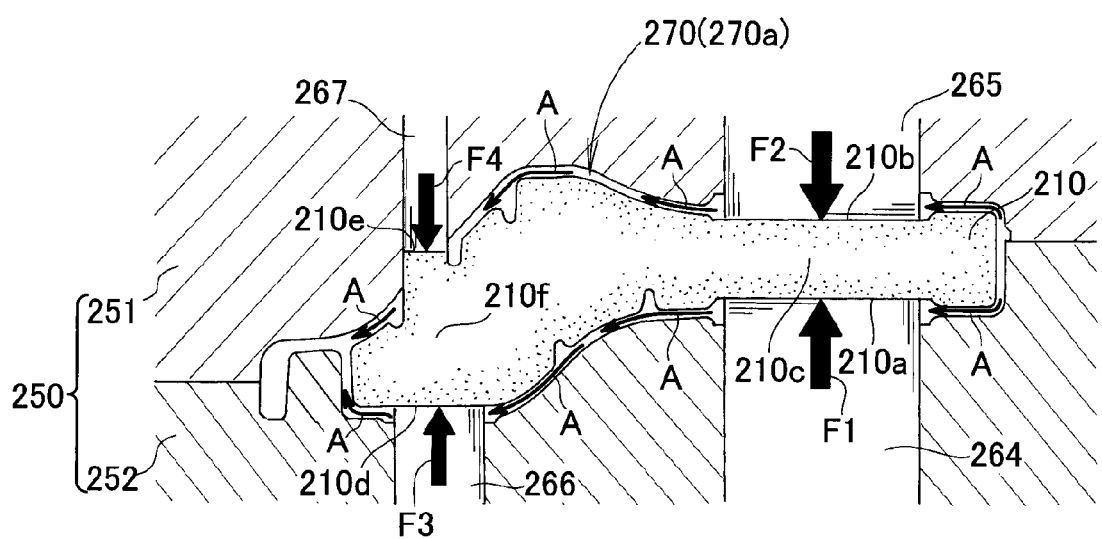
FIG. 15 is a view showing an example in which the subframe according to the invention is formed by casting.

With the left core 210 being placed on the movable mold 252, the fixed mold 251 and the movable mold 252 are clamped together so that the left core 210 is disposed in the left half 270a of the cavity 270, as shown in FIG. 15. In this condition, the part 210a of the left core 210 which corresponds to the left bottom rear sand eliminating opening 75 is pressed by the left bottom rear holding portion 264 of the movable mold 252. At the same time, the part 210b of the left core 210 which corresponds to the left top sand eliminating opening 56 (FIG. 14) is pressed by the left top holding portion 265 of the fixed mold 251. The rear part 210c can thus be subjected to equal support forces F1, F2 applied coaxially from below and above by the left bottom rear holding portion 264 and the left top holding portion 265.

Furthermore, the part 210d of the left core 210 which corresponds to the left bottom front sand eliminating opening 77 (FIG. 4) is pressed by the left bottom front holding portion 266 of the movable mold 252. At the same time, the part 210e of the left core 210 which corresponds to the left top inclined opening 58 (FIG. 4) is pressed by the top core holding pin 267 of the fixed mold 251. The front part 210f of the left core 210 can thus be subjected to support forces F3, F4 applied substantially coaxially from below and above by the left bottom front holding portion 266 and the top core holding pin 267.

The equal support forces F1, F2 are applied coaxially from blow and above to the rear part 210 of the left core 210, and the equal support forces F3, F4 are applied coaxially from below and above to the front part 210f of the left core 210.

With this arrangement, when a molten metal of aluminum alloy is filled in the cavity 270 in a manner as indicated by arrow A, the left core 210 can be held stably in position without displacing (or moving) by the molten metal. By thus preventing the displacement of the left core 210, it is possible to form a subframe 15 having a uniform wall thickness T1 (FIG. 4). The subframe 15 thus made to have a uniform wall thickness T1 is free from a thickened portion and can achieve weight reduction of the subframe 15. A further advantage attained by the subframe 15 made to have a uniform wall thickness T1 is that the strength of the subframe 15 is made stable over the entire area of the subframe.

As shown in FIG. 8, the bottom wall 42 of the body 32 is provided with the central bottom lateral rib 61 located forwardly of the left and right bottom diagonal ribs 64, 65 in the front-and-rear direction of the vehicle. The central bottom lateral rib 61 is disposed on a front part in the vehicle front-and-rear direction of the central area 42k in the vehicle width direction and extends in the vehicle width direction.

The central bottom lateral rib 61 is a rib which is spaced at a predetermined distance from, and extends parallel to, the left rear bottom lateral rib 67c and the right rear bottom lateral rib 67f.

Referring back to FIG. 4, a description will be made about one top holding pin hole 47 which is selected from among the plurality of top holding pin holes 47 provided in the top wall 41, and which is located adjacent to the left front connecting part 81. For distinction from other top holding pin holes 47, this top holding pin hole 47 located adjacent to the left front connecting part 81 will be referred to as "a top holding pin opening or hole 47A".

Figure 16A:
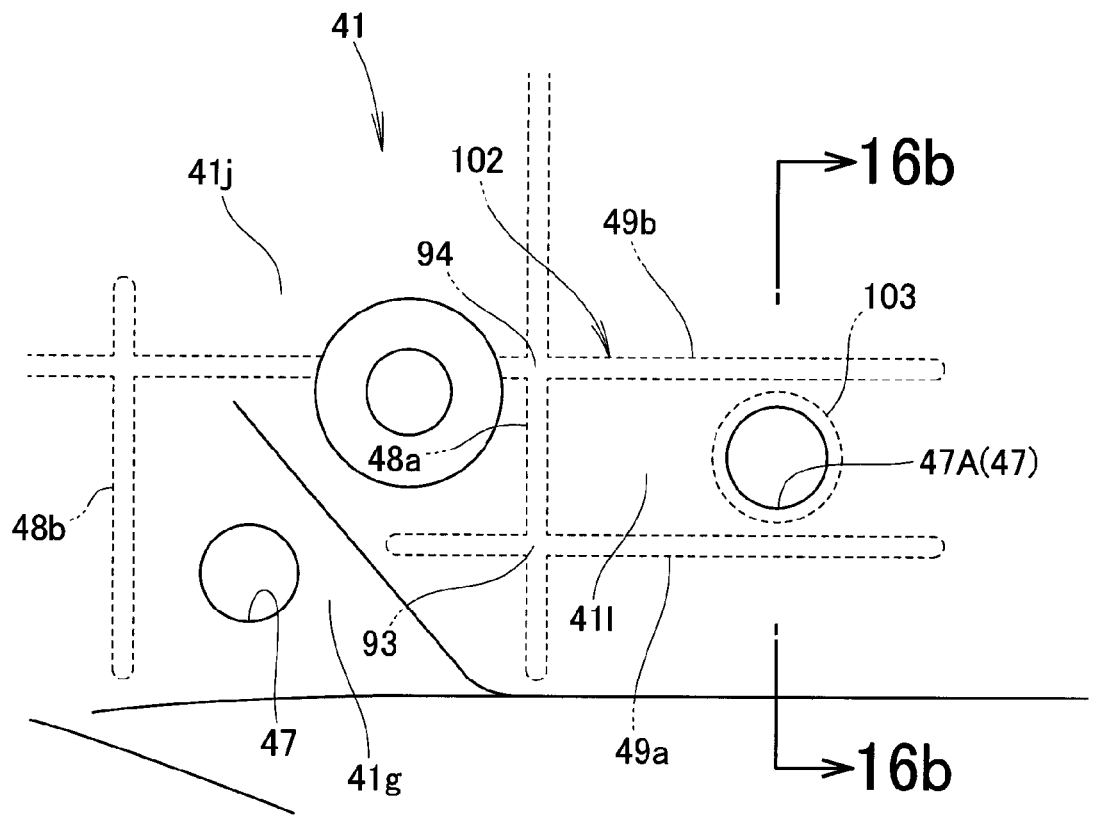
FIG. 16A is an enlarged view of a portion 16a shown in FIG. 6.
Figure 16B:
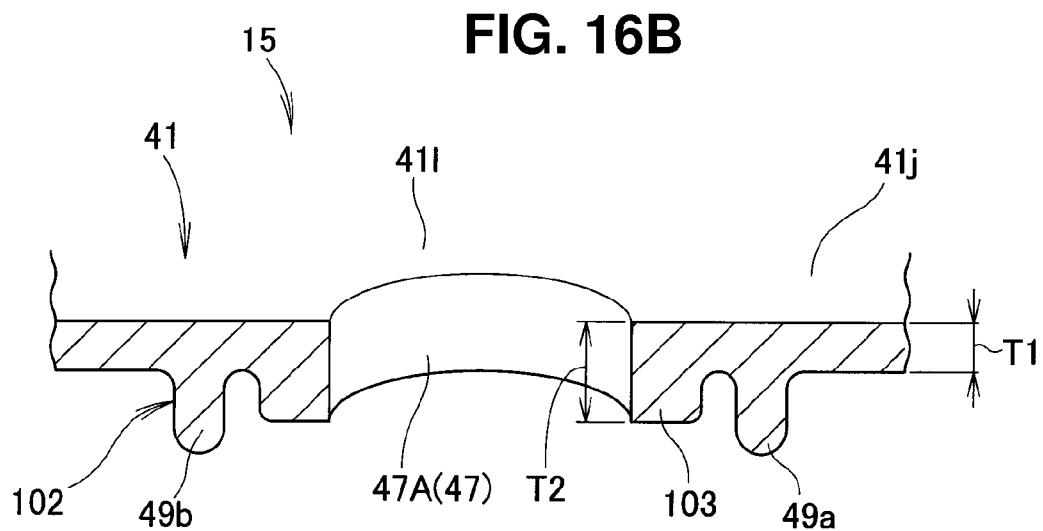
FIG. 16B is a cross-sectional view taken along line 9b-9b of FIG. 16(a)

As shown in FIGS. 16A-16B, in the front part 41g of the top wall 41, the left front top lateral rib 49a, the left rear top lateral rib 49b and the left outer top longitudinal rib 48a together form a substantially U-shaped top rib 102. The top holding pin opening 47A is formed in a circular shape at an area 41l surrounded by the U-shaped top rib 102.

The area 41l surrounded by the top rib 102 includes an annular top peripheral ridge 103 forming a periphery of the top holding pin opening 47A. The top peripheral ridge 103 has a thickness T2 larger than the wall thickness T1 of the subframe 15. The left front top lateral rib 49a, the left rear top lateral rib 49b are disposed adjacent to the top holding pin opening 47A and the top peripheral ridge 103. The top holding pin opening 47A and the top peripheral ridge 103 are surrounded by the top rib 102.

With this arrangement, the top holding pin opening 47a is reinforced by the top peripheral ridge 103 and the top rib 102, so that when the part 41g is subjected to a load applied from the left suspension arm 16 (FIG. 2), the top peripheral ridge 103 and the top rib 102 prevent the top holding pin opening 47A from forming a starting point of stress concentration. By thus preventing the top holding pin opening 47A from forming a starting point of stress concentration, the subframe 15 is free from a problem that the rigidity and strength may be lowered at the position of the top holding pin opening 47A.

Referring back to FIG. 9, a description will be made about two core print openings 63 which are selected from among the plurality of core print openings 63 provided in the bottom wall 42, and one of which is located adjacent to the left front connecting part 81 and the other core print opening being located in the central area 42k in the vehicle width direction. For distinction from other core print openings 63, the core print opening 63 located adjacent to the left front connecting part 81 will be referred to as "a core print opening (hole) 63A", and the core print opening 63 located in the central area 42k in the vehicle width direction will be referred to as "a core print opening (hole) 63B.

Figure 17A:
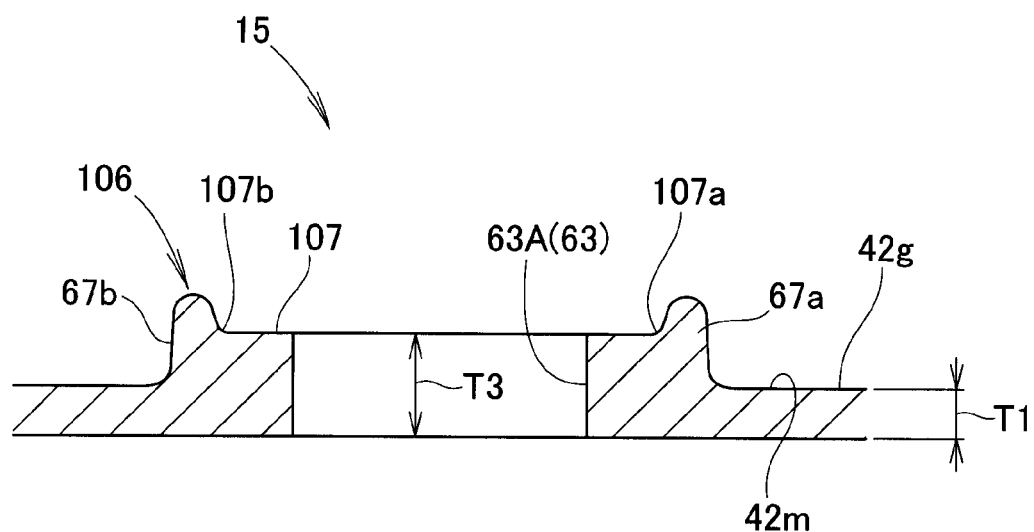
FIG. 17A is a cross-sectional view taken along line 17a-17a of FIG. 8.
Figure 17B:
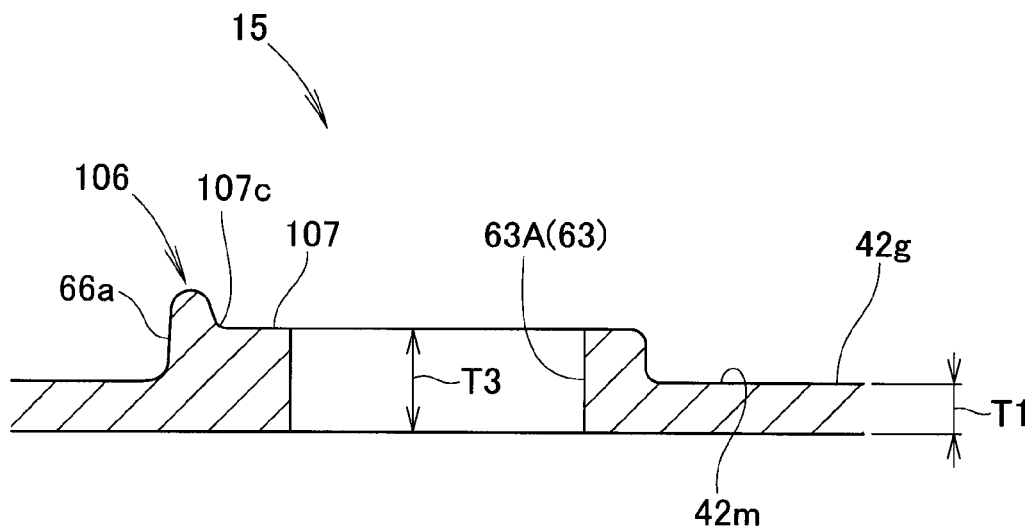
FIG. 17B is a cross-sectional view taken along line 17b-17b of FIG. 8.

As shown in FIGS. 9 and 17A-17B, in the part 42g of the bottom wall 42, the left front bottom lateral rib 67a, the left central bottom lateral rib 67b and the left outer bottom longitudinal rib 66a together form a substantially U-shaped bottom outer rib 106. The core print opening 63A is formed in a circular shape at an area 42m surrounded by the U-shaped bottom outer rib 106.

The area 42m surrounded by the bottom outer rib 106 includes an annular bottom outer peripheral ridge (peripheral ridge) 107 forming a periphery of the core print opening 63A. The bottom outer peripheral ridge 107 has a thickness T3 larger than the wall thickness T1 of the subframe 15. The core print opening 63A and the bottom outer peripheral ridge 107 are surrounded by the U-shaped bottom outer rib 106.

Furthermore, the bottom outer peripheral ridge 107 is connected to the U-shaped bottom outer rib 106. Specifically, the bottom outer peripheral ridge 107 has a joint portion 107a connected to the left front bottom lateral rib 67a and another joint portion 107b connected to the left central bottom lateral rib 67b. The bottom outer peripheral ridge 107 further has a joint portion 107c connected to the left outer bottom longitudinal rib 66a.

With this arrangement, the core print opening 63A is reinforced by the bottom outer peripheral ridge 107 and the bottom outer rib 106, so that when the part 42g is subjected to a load applied from the left suspension arm 16 (FIG. 2), the bottom outer peripheral ridge 107 and the bottom outer rib 106 prevent the core print opening 63A from forming a starting point of stress concentration. By thus preventing the core print opening 63A from forming a starting point of stress concentration, the subframe 15 is free from a problem that the rigidity and strength may be lowered at the position of the core print opening 63A.

Furthermore, in the central area 42k in the vehicle width direction of the bottom wall 42, the central bottom lateral rib 61, the left rear bottom lateral rib 67c and the left inner bottom longitudinal rib 66b together form a substantially U-shaped bottom inner rib 111. The core print opening 63b is formed in a circular shape at an area 42n surrounded by the U-shaped bottom inner rib 111. The area 42n surrounded by the bottom inner rib 111 includes an annular bottom inner peripheral ridge 112 forming a periphery of the core print opening 63B. The bottom inner peripheral ridge 112 has a thickness T4 (not shown) larger than the wall thickness T1 (FIGS. 17A-17B) of the subframe 15. The core print opening 63B and the bottom inner peripheral ridge 112 are surrounded by the U-shaped bottom inner rib 111.

With this arrangement, the core print opening 63B is reinforced by the bottom inner peripheral ridge 112 an the bottom inner rib 111, so that when the central area 42k in the vehicle width direction is subjected to a load applied from the torque rod 26 (see also FIG. 2), the bottom inner peripheral ridge 112 and the bottom inner rib 111 prevent the core print opening 63B from forming a starting point of stress concentration. By thus preventing the core print opening 63B from forming a starting point of stress concentration, the subframe 15 is free from a problem that the rigidity and strength of the subframe may be lowered at the position of the core print opening 63B.

As shown in FIGS. 9 and 16A, the top holding pin opening 47A is reinforced by the top peripheral ridge 103 and the top rib 102, and the core print opening 63A is reinforced by the bottom outer peripheral ridge 107 and bottom outer rib 106. This arrangement ensures that the top core holding pin 253 (FIG. 24) can be located at the front part 41g located adjacent to the left suspension support portion (left front connecting part 81), and the core print 235A (FIG. 21) can be located at the front part 42g.

Furthermore, the core print opening 63B is reinforced by the bottom inner peripheral ridge 112 and the bottom inner rib 111. This arrangement ensures that the bottom core holding pin 200 can be located at the central area 42k in the vehicle width direction. In the manufacture of a subframe 15 by casting, the core unit 200 (FIG. 18) can be properly set by the top core holding pin 53, the core print 235A and the bottom holding pin such that the produced subframe 15 have a uniform wall thickness T1 (FIG. 5).

Figure 19:
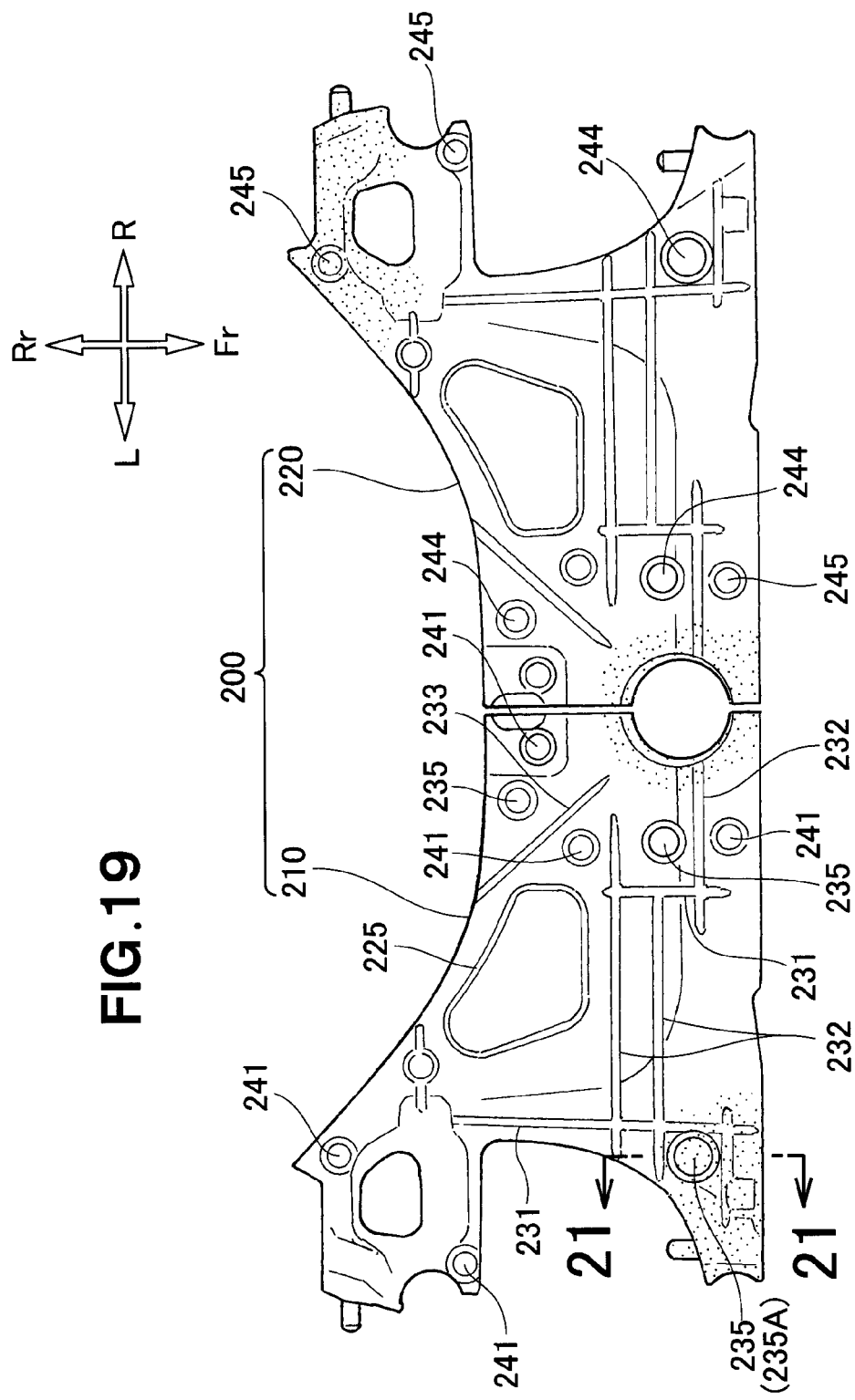
FIG. 19 is a bottom view of the core unit shown in FIG. 18.

Next, the core unit 200 used for casting the subframe 15 will be described with reference to FIGS. 18 and 19. As shown in FIGS. 18 and 19, the core unit 200 is formed by core sand in a state in which it is divided into the left core 210 and the right core 220. In cast-molding the subframe 15 (FIG. 3), the core unit 200 is used to ensure that the hollow part 45 (FIG. 5) is formed in the subframe 15.

Figure 20:
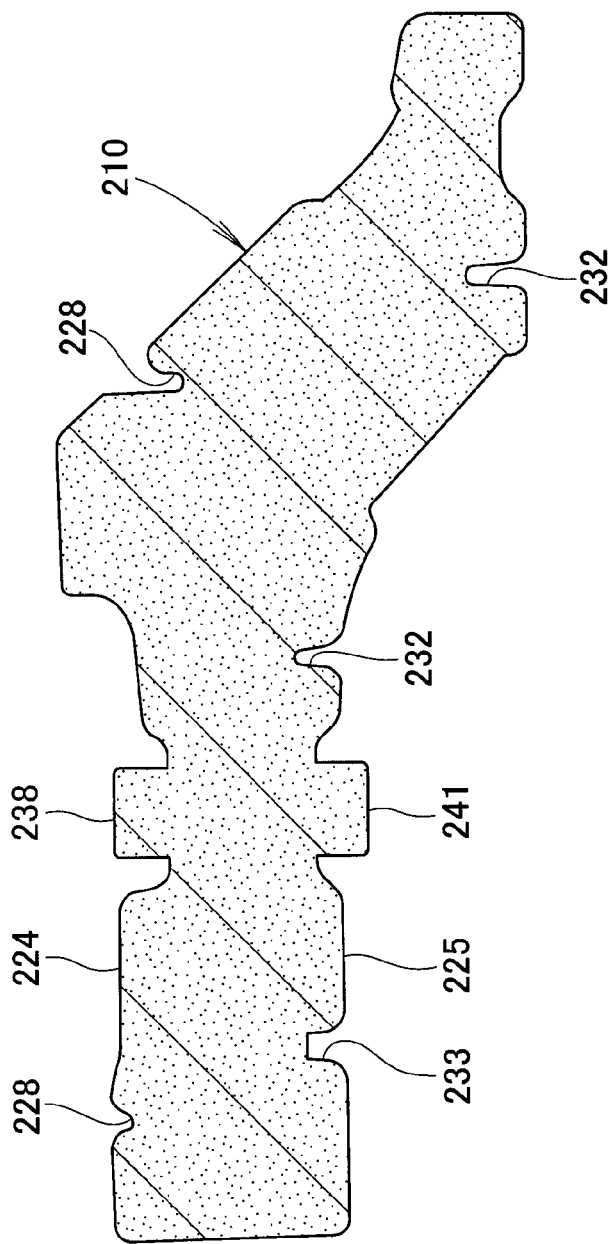
FIG. 20 is a cross-sectional view taken along line 20-20 of FIG. 18.

As shown in FIGS. 18 and 20, the left core 210 has a top surface 224 in which a plurality of top longitudinal grooves 227 and a plurality of top lateral grooves 228 are formed. By means of the plurality of top longitudinal grooves 227 and the plurality of top lateral grooves 228, the top longitudinal ribs 48 and the top lateral ribs 49 are formed on the top wall 41 of the subframe 15.

As shown in FIGS. 19 and 20, the left core 210 has a bottom surface 225 in which a plurality of bottom longitudinal grooves 231, a plurality of bottom lateral grooves 232, and a diagonal groove 233. By means of the plurality of bottom longitudinal grooves 231, the plurality of bottom lateral grooves 232, and the diagonal groove 233, the bottom longitudinal ribs 66, the bottom lateral ribs 67, the central bottom lateral rib 61 and the left diagonal rib 64 are formed on the bottom wall 42 of the subframe 15, as shown in FIG. 8.

As shown in FIGS. 8 and 19, the left core 210 has a plurality of core prints 235 provided on the bottom surface 225 along a periphery thereof. A selected one of the core prints 235 which is located adjacent to the left front connecting part 81 will be described. For distinction from other core prints 235, the selected core print located adjacent to the left connecting part 81 will be referred to as "a core print 235A".

Figure 21:
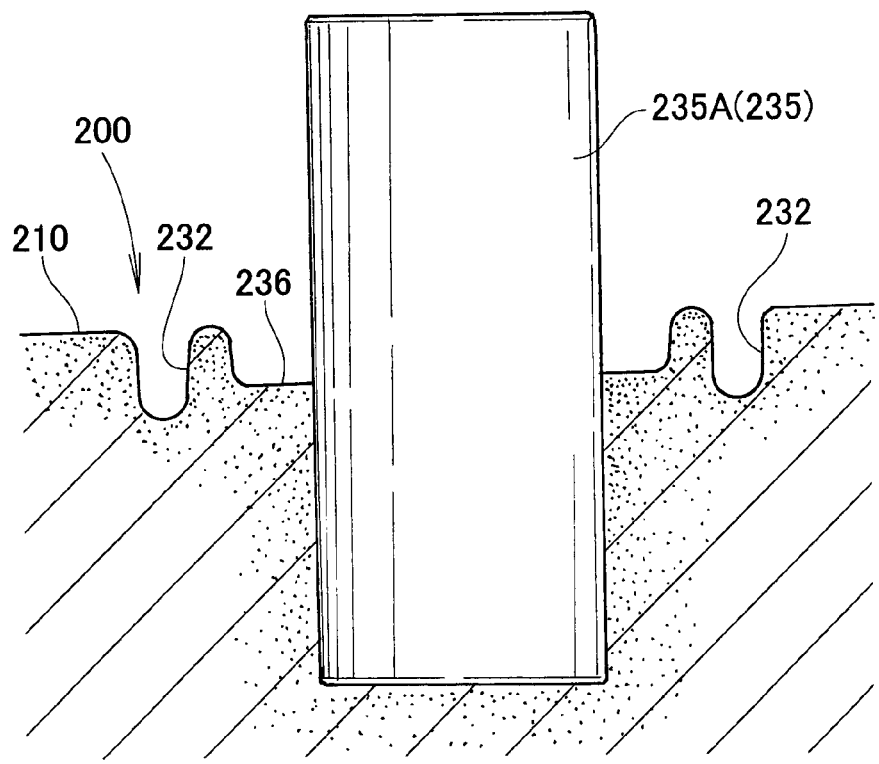
FIG. 21 is a cross-sectional view taken along line 21-21 of FIG. 19.

As shown in FIG. 21, the core print 235A is provided in such a manner as to locate adjacent to the left front connecting part 81 (FIG. 8), a bottom peripheral recessed portion 236 is formed around the core print 235A, and the bottom lateral grooves 232 are formed on both outer sides of the bottom peripheral recessed portion 236.

As shown in FIGS. 6 and 18, the left core 210 has a plurality of top protrusions 238 (FIG. 20) projecting from the top surface 224 thereof. Now, a description will be made about one top protrusion 238, which is selected from among the top protrusions 238 provided on the top surface 224 and which is located adjacent to the left front connecting part 81. For discrimination from other top protrusions 238, the selected top protrusion 238 will be referred to as "a top protrusion 238A".

Figure 22:
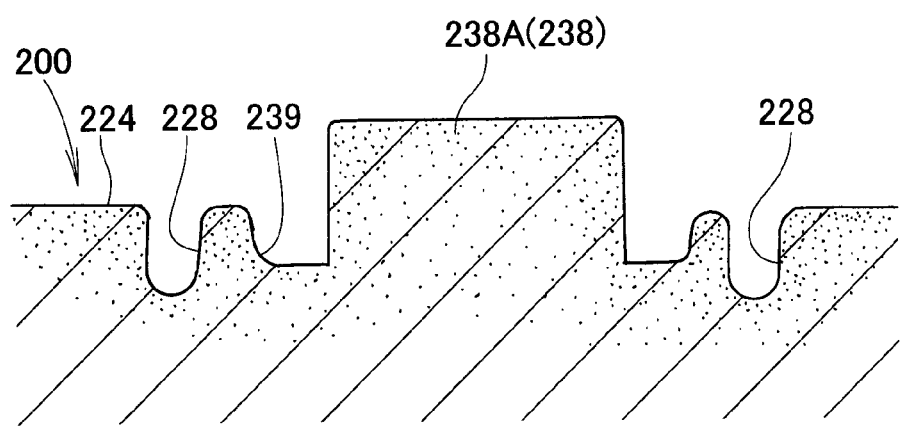
FIG. 22 is a cross-sectional view taken along line 22-22 of FIG. 18.

As shown in FIG. 22, the top protrusion 238A is provided in such a manner as to locate adjacent to the left front connecting part 81 (FIG. 6), a top peripheral recessed portion 239 is formed around the top protrusion 238A, and the top lateral grooves 228 are formed on both outer sides of the top peripheral recessed portion 239.

Furthermore, as shown in FIG. 19, the left core 210 has a plurality of bottom protrusions 241 (see also FIG. 20) projecting from the bottom surface 225 thereof.

Figure 23:
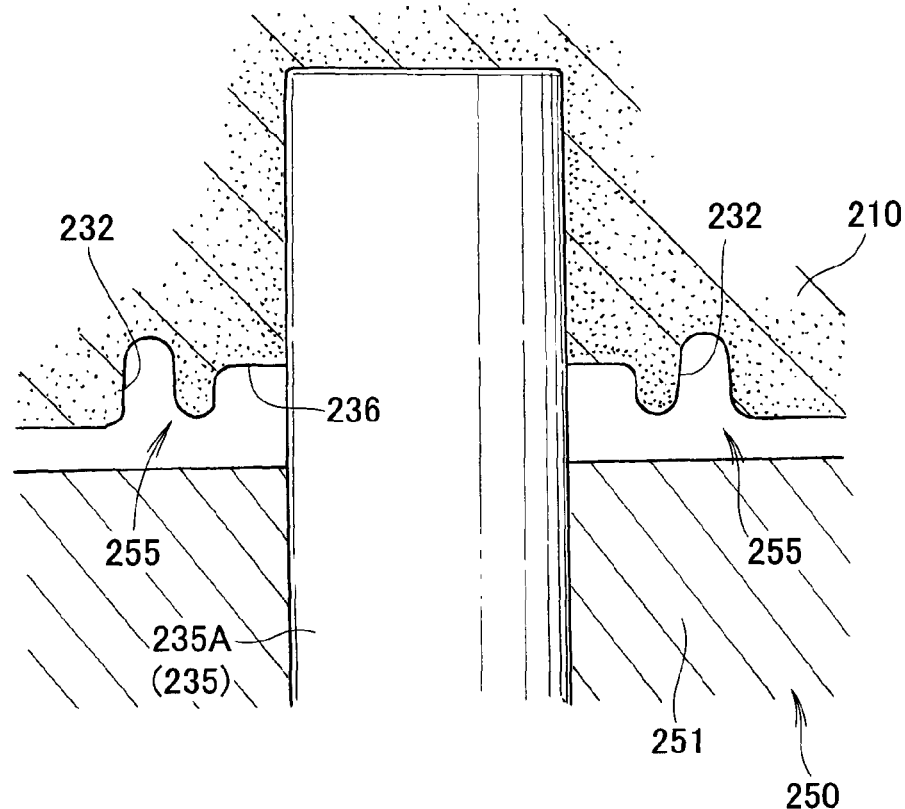
FIG. 23 is a cross-sectional view illustrative of the manner in which a left core is supported by a core print according to the invention.
Figure 24:
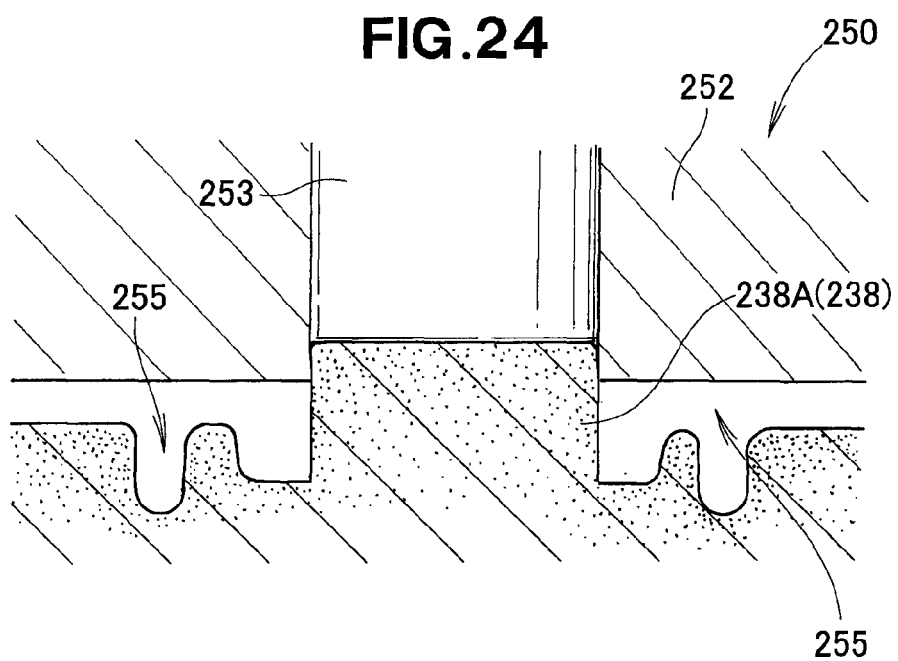
FIG. 24 is a cross-sectional view illustrative of the manner in which the left core is supported by a top core holding pin according to the invention.

As shown in FIG. 23, in cast-molding the subframe 15 (FIG. 3), the core print 235A on the bottom surface 25 is supported by the movable mold 251 of the casting mold 250. Furthermore, the plurality of bottom protrusions 241 (FIG. 19) are held by the movable mold 251 (more particularly by the bottom core holding pins). Also as shown in FIG. 24, the top protrusion 238A is held by the fixed mold 252 (more particularly by one of the top core holding pin 253) of the casting mold 250. The left core 210 can thus be held in the cavity 270 (more particularly in a left half of the cavity 270) of the casting mold 250.

As shown in FIGS. 18 and 19, the right core 220 is a member which is substantially bilaterally symmetrical with the left core 210. In cast-molding the subframe 15 (FIG. 3), core prints 244 on the bottom surface 225 are held by the movable mold 251 (FIG. 23) in the same manner as done for the left core 210. Furthermore, a plurality of bottom protrusions 245 is held by a corresponding number of bottom core holding pins. Additionally, a plurality of top protrusions 246 is held by a corresponding number of top core holding pins 253 (FIG. 24). The right core 220 can thus be held in the cavity 255 (more particularly in a right half of the cavity 255) of the casting mold 250 in a like manner as done for the left core 210.

In this condition, a molten metal of aluminum alloy is filled into the cavity 255 so that a subframe 15 (see FIG. 3) is cast-molded. During that time, since the top core holding pins 253, the core print 235A, and the bottom core holding pins can properly set the core unit 200 (FIG. 18) in the cavity 255 while the cavity 255 is filled with the aluminum alloy molten metal, the subframe 15 is formed to have a uniform wall thickness T1 (FIG. 5).

The subframe according to the invention should by no means be limited to the one shown in the foregoing embodiment but various changes and modifications are possible. For instance, in the illustrated embodiment, the subframe 15 is made of aluminum alloy. This is not restrictive and the present invention is also applicable to other metals.

Furthermore, in the illustrated embodiment, the subframe 15 made of aluminum alloy is formed by high-pressure casting. This is not restrictive and the present invention can be also applied to other casting methods.

Yet, as to the subframe, the left and right suspension arms, the left and right suspensions, the torque rod, the body, the left and right suspension support portions, the central connecting portion, the top wall, the bottom wall, the top holding pin holes, the left outer top longitudinal ribs, the left and right front top lateral ribs, the left and right rear top lateral ribs, the central bottom lateral rib, the bottom holding pin holes, the core print openings, the left and right diagonal ribs, the left and right inner bottom longitudinal ribs, the left and right rear bottom lateral ribs, the core unit, the core prints and the top core holding pins shown in the illustrated embodiment, the shape and configuration should by no means be limited to the ones shown in the illustrated embodiment but various changes and modifications are possible.

INDUSTRIAL APPLICABILITY

The present invention is particularly suitable for application to motor vehicles of the type including a subframe provided under a vehicle body for supporting left and right suspensions at left and right ends thereof.

REFERENCE SIGNS LIST

10 . . . vehicle body front part structure, 15 . . . subframe (vehicle subframe), 16, 17 . . . left and right suspension arms (suspension arms), 21, 22 . . . left and right suspensions (suspensions), 25 . . . power plant, 26 . . . torque rod (connecting member), 32 . . . body, 32a . . . left end of body, 32b . . . right end of body, 35, 37 . . . left and right suspension support portions, 38 . . . central connecting portion, 41 . . . top wall, 41g, 42g . . . part adjacent to left suspension support portion, 42 . . . bottom wall, 42k . . . central area in vehicle width direction (part adjacent to connecting portion, 47A . . . top holding pin opening (hole), 48 . . . top longitudinal ribs (longitudinal ribs), 48a . . . left outer top longitudinal rib (crossing rib), 49 . . . top lateral ribs (lateral ribs), 49a, 49c . . . left and right front top lateral ribs (parallel ribs), 49b, 49d . . . left and right rear top longitudinal ribs (ribs), 52 . . . top parallel section, 54 . . . top inclined section (inclined section), 56 . . . left top sand eliminating opening (top opening), 57 . . . right top sand eliminating opening (top opening), 58 . . . left top inclined opening (inclined opening), 59 . . . right top inclined opening (inclined opening), 61 . . . central bottom lateral rib (parallel rib), 62, 62A . . . bottom holding pin openings (holes), 63, 63A, 63B, 63C . . . core print openings (holes), 64, 65 . . . left and right diagonal ribs (ribs), 66 . . . bottom longitudinal ribs (longitudinal ribs), 66b, 66d . . . left and right inner bottom longitudinal ribs (crossing ribs), 67 . . . bottom lateral ribs (lateral ribs), 67c, 67f . . . left and right rear bottom lateral ribs (ribs), 71 . . . bottom rear parallel section (bottom parallel section), 75 . . . left bottom rear sand eliminating opening (bottom opening), 76 . . . right bottom rear sand eliminating opening (bottom opening), 77 . . . left bottom front sand eliminating opening (front opening), 78 . . . right bottom front sand eliminating opening (front opening), 200 . . . core unit (core), 235 . . . core print (core supporting portion), 253 . . . top core holding pin (corer supporting portion), T2, T3, T4 . . . thickness

The invention claimed is:

1. A vehicle subframe cast-molded into a unitary structure using a core, the vehicle subframe comprising;
    a body formed into a hollow shape by means of the core and including a top wall and a bottom wall spaced from each other in a vertical direction at a predetermined interval, and left and right suspension support portions provided at left and right ends of the body for supporting left and right suspensions;
    a top parallel section and a bottom parallel section that are substantially parallel to each other in a front-and-rear direction of a vehicle and that are provided in the top wall and the bottom wall, respectively, of the body;
    top openings formed in the top parallel section; and
    bottom openings provided at parts of the bottom parallel section which are opposed to respective ones of the top openings, the bottom openings being formed into a shape equivalent to a shape of the top openings;
    wherein the top openings and the bottom openings are configured to function as sand elimination openings;
    wherein the subframe has a uniform wall thickness.

2. The vehicle subframe of claim 1, wherein the body has longitudinal ribs provided at a part located adjacent to each of the left and right suspension support portions and extending in the front-and-rear direction of the vehicle, and lateral ribs provided at the part and extending in a width direction of the vehicle.

3. The vehicle subframe of claim 2, wherein the body is provided with a connecting portion adapted to be connected with a connecting member for supporting a power plant forming a drive source of the vehicle, and wherein the body includes ribs extending from the connecting portion toward an outer side of the body, and holes formed near respective ones of the ribs by means of core supporting portions used for supporting the core.

4. The vehicle subframe of claim 1, wherein the body is provided with a connecting portion adapted to be connected with a connecting member for supporting a power plant forming a drive source of the vehicle, and wherein the body includes ribs extending from the connecting portion toward an outer side of the body, and holes formed near respective ones of the ribs by means of core supporting portions used for supporting the core.

5. A vehicle subframe cast-molded into a unitary structure using a core, the vehicle subframe comprising:
    a body formed into a hollow shape by means of the core and including a top wall and a bottom wall spaced from each other in a vertical direction at a predetermined interval, and left and right suspension support portions provided at left and right ends of the body for supporting left and right suspensions;
a top parallel section and a bottom parallel section that are substantially parallel to each other in a front-and-rear direction of a vehicle and that are provided in the top wall and the bottom wall, respectively, of the body;
top openings formed in the top parallel section; and
bottom openings provided at parts of the bottom parallel section which are opposed to respective ones of the top openings, the bottom openings being formed into a shape equivalent to a shape of the top openings,
wherein the top wall includes an inclined section provided at a front part thereof in the front-and-rear direction of the vehicle, the inclined section being downward inclined toward a front side of the vehicle, and inclined openings formed in the inclined section, and wherein the bottom wall includes front openings formed therein at portions which are opposed to respective ones of the inclined openings.

6. The vehicle subframe of claim 5, wherein the body has longitudinal ribs provided at a part located adjacent to each of the left and right suspension support portions and extending in the front-and-rear direction of the vehicle, and lateral ribs provided at the part and extending in a width direction of the vehicle.

7. The vehicle subframe of claim 5, wherein the body is provided with a connecting portion adapted to be connected with a connecting member for supporting a power plant forming a drive source of the vehicle, and wherein the body includes ribs extending from the connecting portion toward an outer side of the body, and holes formed near respective ones of the ribs by means of core supporting portions used for supporting the core.

8. A vehicle subframe cast-molded into a unitary structure using a core, the vehicle subframe comprising:
a body formed into a hollow shape by means of the core and including a top wall and a bottom wall spaced from each other in a vertical direction at a predetermined interval, and left and right suspension support portions provided at left and right ends of the body for supporting left and right suspensions;
a top parallel section and a bottom parallel section that are substantially parallel to each other in a front-and-rear direction of a vehicle and that are provided in the top wall and the bottom wall, respectively, of the body;
top openings formed in the top parallel section; and
bottom openings provided at parts of the bottom parallel section which are opposed to respective ones of the top openings, the bottom openings being formed into a shape equivalent to a shape of the top openings,
wherein the top openings and the bottom openings are configured to function as holding portions for holding the core;
wherein the subframe has a uniform wall thickness.

9. A method of producing a vehicle subframe comprising a body formed into a hollow shape by means of a core and including a top wall and a bottom wall spaced from each other in a vertical direction at a predetermined interval, and left and right suspension support portions provided at left and right ends of the body for supporting left and right suspensions, a top parallel section and a bottom parallel section that are substantially parallel to each other in a front-and-rear direction of a vehicle and that are provided in the top wall and the bottom wall, respectively, of the body; top openings formed in the top parallel section; and bottom openings provided at parts of the bottom parallel section which are opposed to respective ones of the top openings, the bottom openings being formed into a shape equivalent to a shape of the top openings, the method of producing the vehicle subframe comprising steps of:
supporting the core by a movable mold and supporting a pressing portion of the core facing the top openings and the bottom openings, respectively, by holding portions;
clamping the movable mold with a fixed mold; and
filling a cavity with a molten metal.

* * * * *